United States Patent
Kojima et al.

(10) Patent No.: US 8,469,602 B2
(45) Date of Patent: *Jun. 25, 2013

(54) OPTICAL FIBER CONNECTING PART AND OPTICAL MODULE USING THE SAME

(75) Inventors: Seiji Kojima, Hitachi (JP); Kanako Suzuki, Hitachi (JP); Mikio Ohkoshi, Hitachi (JP); Yoshikazu Namekawa, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 267 days.

This patent is subject to a terminal disclaimer.

(21) Appl. No.: 12/805,389

(22) Filed: Jul. 28, 2010

(65) Prior Publication Data

US 2011/0033159 A1 Feb. 10, 2011

(30) Foreign Application Priority Data

Jul. 30, 2009 (JP) ................................. 2009-178146

(51) Int. Cl.
*G02B 6/38* (2006.01)

(52) U.S. Cl.
USPC .................................. 385/67; 385/72; 385/79

(58) Field of Classification Search
USPC ................................. 385/61, 67, 79
See application file for complete search history.

(56) References Cited

U.S. PATENT DOCUMENTS

| | | | |
|---|---|---|---|
| 4,818,061 A * | 4/1989 | Iwano et al. ..................... | 385/72 |
| 4,988,161 A * | 1/1991 | Fujikawa et al. ................ | 385/68 |
| 5,062,682 A * | 11/1991 | Marazzi ........................... | 385/85 |
| 5,778,126 A * | 7/1998 | Saitoh .............................. | 385/84 |
| 5,867,620 A * | 2/1999 | Bunin et al. ..................... | 385/53 |
| 7,379,648 B1 * | 5/2008 | Brooks et al. .................. | 385/126 |
| 7,594,765 B2 * | 9/2009 | Althaus et al. .................. | 385/67 |
| 2003/0174971 A1 * | 9/2003 | Shigenaga et al. .............. | 385/71 |
| 2004/0161205 A1 * | 8/2004 | Hengelmolen et al. ......... | 385/78 |
| 2006/0210225 A1 * | 9/2006 | Fujiwara et al. ................ | 385/92 |
| 2006/0246772 A1 | 11/2006 | Yamaguchi et al. | |

FOREIGN PATENT DOCUMENTS

| JP | 61282807 A | * | 12/1986 |
|---|---|---|---|
| JP | 08-286079 A | | 11/1996 |
| JP | 11-271567 | * | 10/1999 |
| JP | 2005-008448 A | | 1/2005 |
| JP | 2005-221839 A | | 8/2005 |
| JP | 2006-310197 | | 11/2006 |
| JP | 2007-256372 | | 10/2007 |

OTHER PUBLICATIONS

Japanese Office Action dated Oct. 23, 2012 with English translation thereof.

* cited by examiner

*Primary Examiner* — Charlie Peng
(74) *Attorney, Agent, or Firm* — McGinn IP Law Group, PLLC

(57) ABSTRACT

An optical fiber connecting part has a ferrule, and a guide bore penetrating through the ferrule and configured to guide an optical fiber to be inserted. The guide bore has a first bore provided at one end of the ferrule, through which the optical fiber is inserted into the ferrule, a second bore provided at another end of the ferrule, the second bore having an inner diameter smaller than an inner diameter of the first bore, and an intermediate bore provided between the first bore and the second bore to directly connect between the first bore and the second bore. A center axis of the second bore is shifted from a center axis of the first bore.

20 Claims, 27 Drawing Sheets

FIG.1A
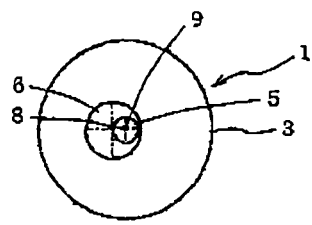
FIG.1B  FIG.1C  FIG.1D
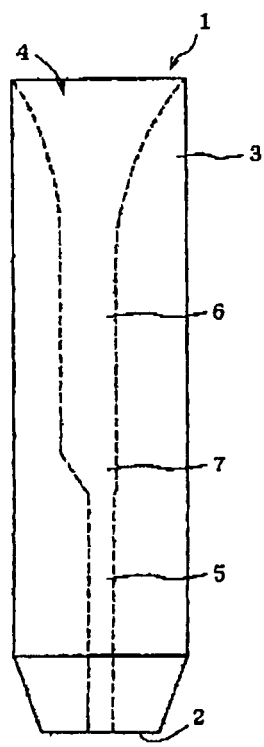 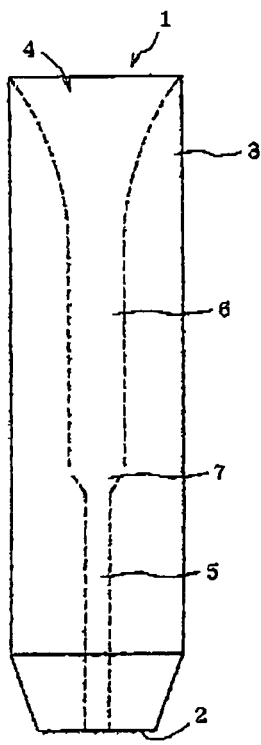 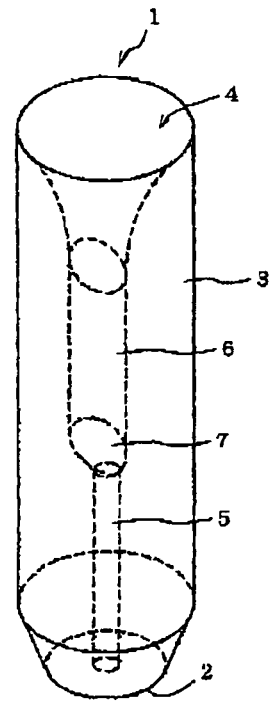
FIG.1E
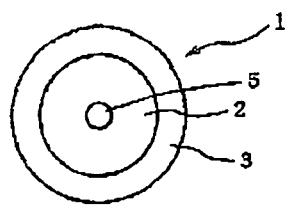

FIG.2A
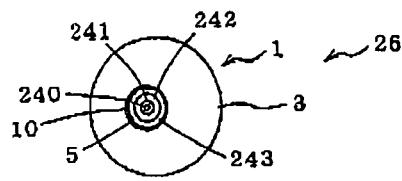
FIG.2B    FIG.2C    FIG.2D
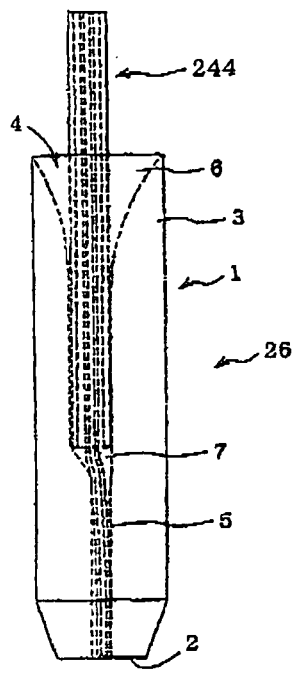 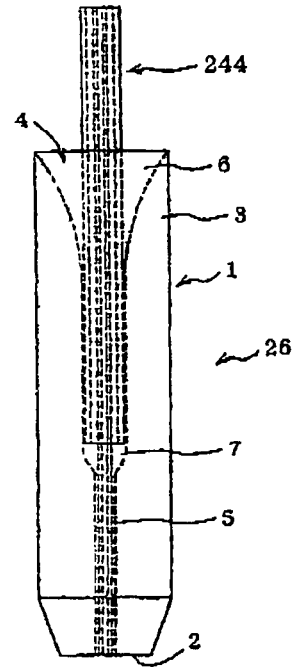 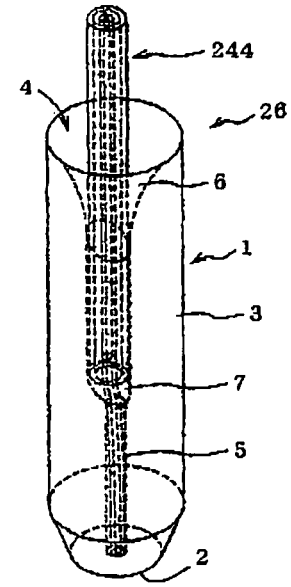
FIG.2E    FIG.2F
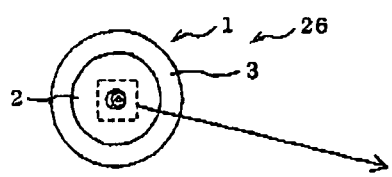 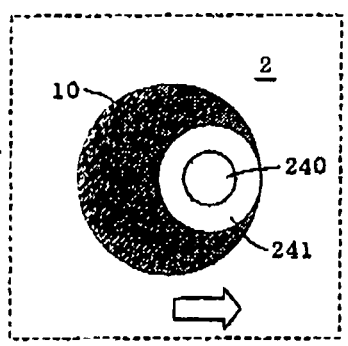

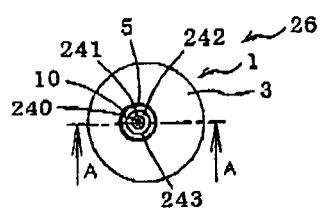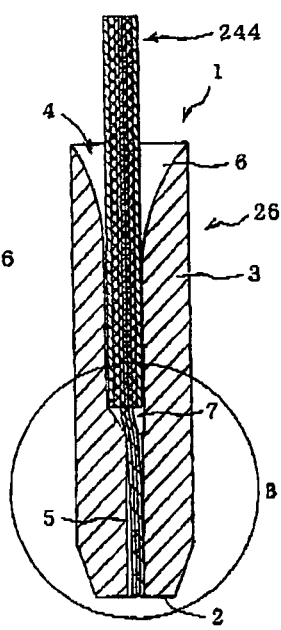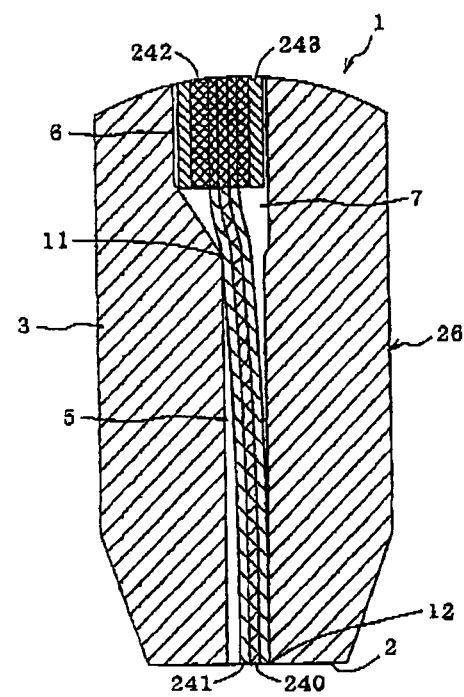

FIG.5A
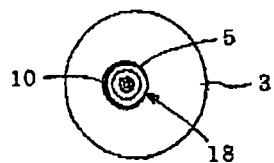
FIG.5B
FIG.5C
FIG.5D
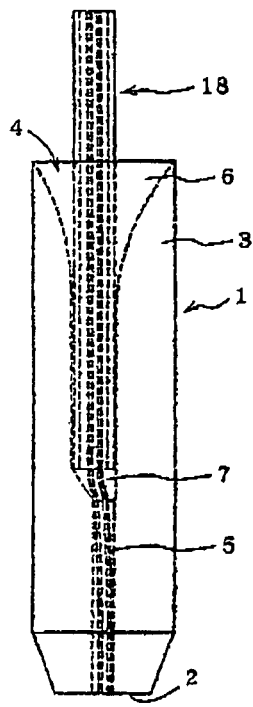
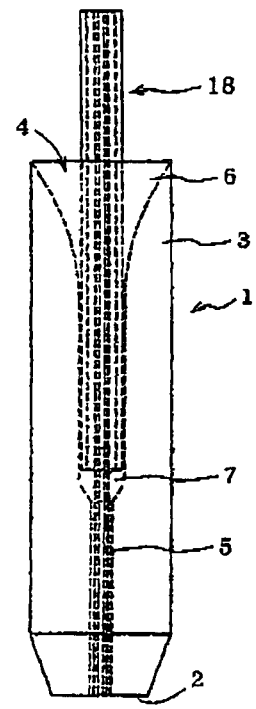
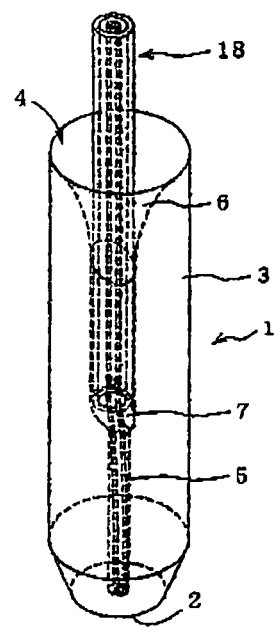
FIG.5E
FIG.5F
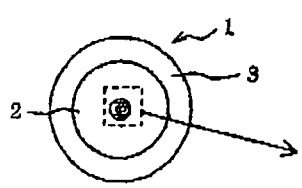
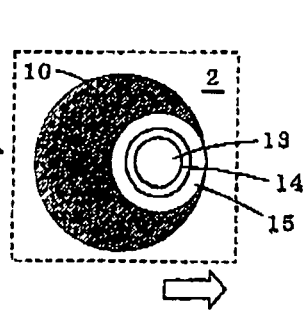

FIG.8A
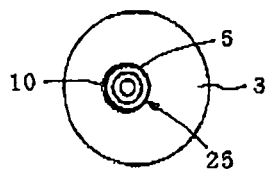
FIG.8B  FIG.8C  FIG.8D
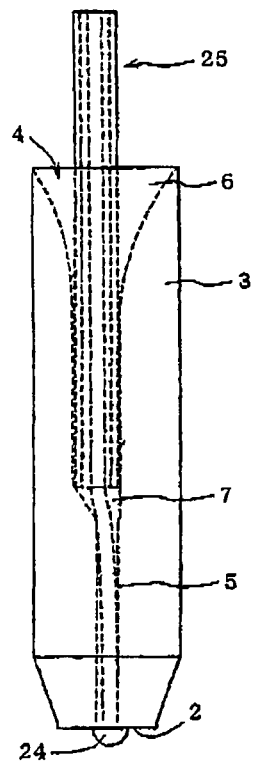 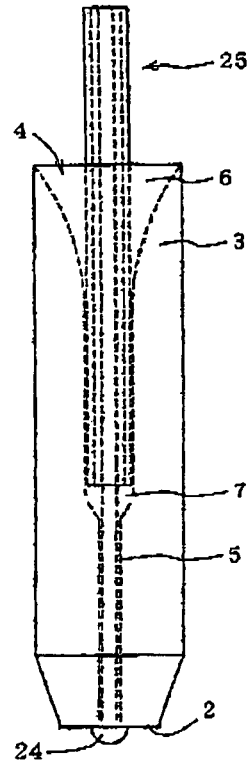 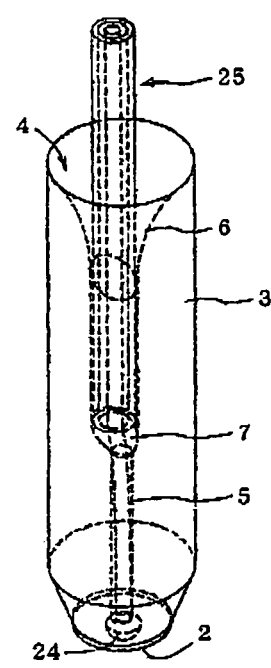
FIG.8E
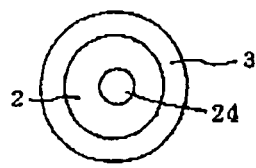

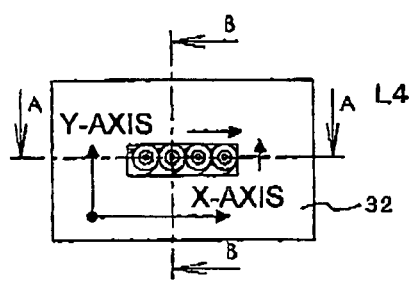
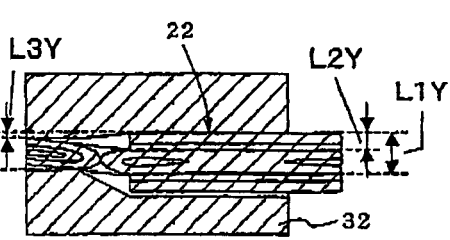
FIG.12A  FIG.12B
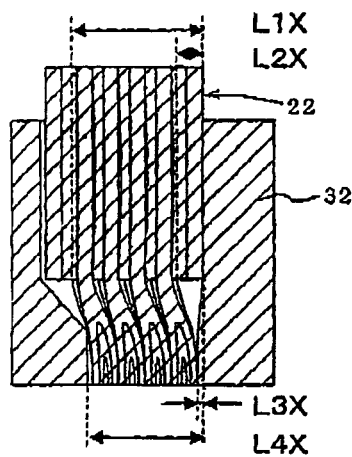
FIG.12C

FIG.25A
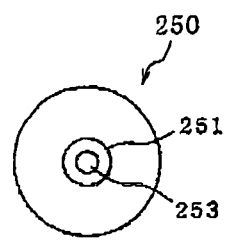
FIG.25B   FIG.25C
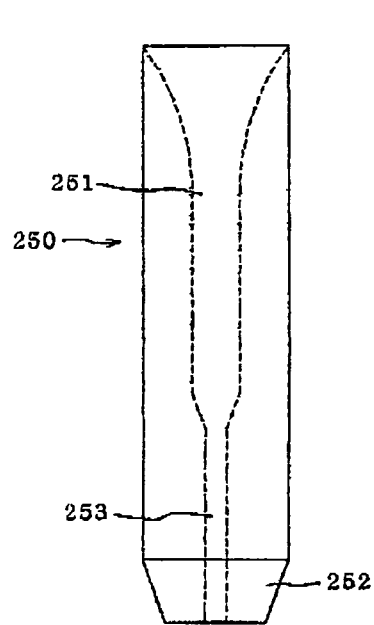 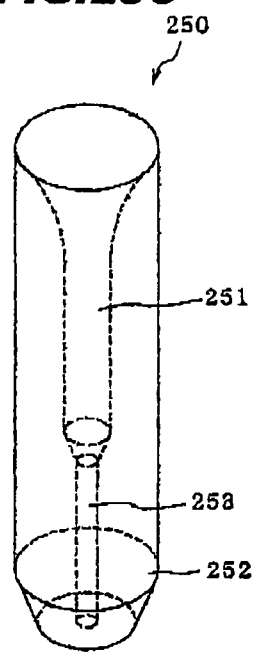

OPTICAL FIBER CONNECTING PART AND OPTICAL MODULE USING THE SAME

The present application is based on Japanese Patent Application No. 2009-178146 filed on Jul. 30, 2009, the entire contents of which are incorporated herein by reference.

BACKGROUND OF THE INVENTION

1. Field of the Invention

The present invention relates to an optical fiber connecting part and an optical module using the same, for electrically and mechanically connecting an optical fiber to a photoelectric conversion module, on which a light emitting device or light receiving device is mounted on a substrate.

2. Description of the Related Art

In recent years, techniques of performing high-speed transmission of digital signal of large capacity in order to transmit photographic data or moving image data of large capacity at high speed between devices such as computer and liquid-crystal display. For transmitting the digital signal of large capacity at high speed, an optical interconnection system using an optical fiber as transmission path between the devices such as computer, liquid-crystal display, video camera, data recorder has been developed in these days.

As the optical interconnection system, for example, Japanese Patent Laid-Open No. 2006-310197 (JP-A 2006-310197) discloses a system for connecting between devices by means of an optical cable, which comprises a connector including a photoelectric conversion module inside and is connected to an end of a complex cable comprising an optical fiber and a signal line (metal wire).

In such optical fiber, an end face of the optical fiber in the complex cable is connected to an optical device such as light emitting device or light receiving device which is mounted on the substrate in the photoelectric conversion module via an optical fiber connecting part at a connecting portion between the complex cable and the connector. For example, Japanese Patent Laid-Open No. 2007-256372 (JP-A 2007-256372) discloses such technique.

Conventionally, as the optical fiber, for example, a singe-core optical fiber 244 with a structure shown in FIG. 24A, and a multi-core optical fiber (tape-like optical fiber) 246 with a structure shown in FIG. 24B have been used. The single-core optical fiber 244 comprises a core 240, a clad 241, a low Young modulus layer (inner coating layer) 242 having Young modulus of 10 MPa or less and provided around the clad 241, and a high Young modulus layer (outer coating layer) 243 having Young modulus of 100 MPa or more and provided around the low Young modulus layer 242. The multi-core optical fiber 246 comprises a plurality of the single-core optical fibers 244 that are aligned in one column (geometrically in parallel), and the high Young modulus layer (coating layer) 245 having Young modulus of 100 MPa or more and coating the aligned single-core optical fibers 244.

The single-core optical fiber 244 or the multi-core optical fiber 246 is bonded and coupled at its end part to a ferrule (optical fiber connecting part) to provide a connector, and used for an optical module in which a tip end of the connector is optically connected to an optical device, other optical fiber or the like.

For forming a connector from the conventional optical fiber, an optical fiber should be inserted into the ferrule. As shown in FIGS. 25A to 25C, a conventional ferrule 250 comprises an optical fiber insertion hole 251 which has an inner diameter greater than an outer diameter of the single-core optical fiber 244 including the inner and outer coating layers 242, 243 and is provided on a side of one end of the ferrule 250, and a light input/output bore 253, which has an inner diameter substantially corresponding to an outer diameter of the clad 241 of the single-core optical fiber 244 (i.e. slightly greater than the outer diameter of the clad 241), and inputs and outputs a light at an end face of another end part 252 of the ferrule 250, in which the optical fiber insertion hole 251 communicates with the light input/output bore 253. This optical fiber insertion hole 251 and the light input/output bore 253 are concentric.

FIG. 26 shows the single-core optical fiber 244 connected and bonded to the ferrule 250 as shown in FIG. 25A to 25C. An inner structure of the ferrule 250 is as follows. An optical fiber comprising only the core 240 and the clad 241, i.e. the single-core optical fiber 244 from which the inner and outer coating layers 242, 243 (the low Young modulus layer 242 and the high Young modulus layer 243 as shown in FIG. 24A) are removed, is inserted into the light input/output bore 253 provided on the another end part 252 of the ferrule 250, and is fixed with an adhesive 260. Thereafter, a light input and output end face 261 of the ferrule 250 is polished. As to a cross section of the ferrule 250, the ferrule 250 may have a rectangular cross section in addition to a circular cross section as shown in FIG. 25A.

The multi-core optical fiber 246 has a structure similar to the structure of the single-core optical fiber 244. The high Young modulus layer 245 which collectively coats the multi-core optical fiber 246 is removed, and respective cores 240 are separated from each other. Thereafter, the multi-core optical fiber 246 is inserted into the ferrule 250, in which bores of the number corresponding to the number of the single-core optical fibers 244 are formed, and terminal-processed similarly to the structure shown in FIG. 26.

SUMMARY OF THE INVENTION

However, the inner diameter of the light input/output bore 253 of the ferrule 250 for accommodating the single-core optical fibers 244, from which the inner and outer coating layers 242, 243 are removed, is greater than the outer diameter of the single-core optical fiber 244 (i.e. the outer diameter of the clad 241). Therefore, a position of the end face of the optical fiber 244 with respect to an opening of the light input/output bore 253, which faces to the light input and output end face 261 of the ferrule 250 as shown in FIGS. 27A to 27D, is not constant for each insertion. As a result, variation of the position of the end face of the optical fiber 244 may be caused. Accordingly, operation for positioning the end face of the optical fiber (including the core and the clad) with high precision is troublesome and complicated. In other words, there is a disadvantage in that reproducibility of products is not good.

Accordingly, an object of the present invention is to provide an optical fiber connecting part and an optical module using the same, by which an end face of an optical fiber can be easily positioned at a predetermined position of one end face of a ferrule with high reproducibility.

According to a feature of the invention, an optical fiber connecting part comprises:

a ferrule; and a guide bore, which is formed to penetrate through the ferrule from an end face on a side of one end to another end face on a side of another end of the ferrule, and configured to guide an optical fiber to be inserted from the on the side of the one end of the ferrule toward the end face on the side of the other end of the ferrule, the guide bore comprising:

an optical fiber insertion hole provided on the side of the one end, through which the optical fiber is inserted into the ferrule;

a light input/output bore provided on the side of the other end of the ferrule and having an inner diameter smaller than an inner diameter of the optical fiber insertion hole, through which a light is input and output at the end face on the side of the other end of the ferrule; and a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore, wherein the shape of the shape-changing bore is changed such that a center axis of the light input/output bore is shifted along a direction for restricting the optical fiber with respect to a center axis of the optical fiber insertion hole.

The shape of the shape-changing bore may be changed such that the center axis of the light input/output bore is shifted along a vertical direction with respect to the center axis of the optical fiber insertion hole.

An inclination angle of an inner surface of the shape-changing bore with respect to an insertion direction of the optical fiber may be varied in a circumferential direction.

The optical fiber insertion hole may comprise a vertical surface, which guides the optical fiber to be inserted along a vertical direction, and a curved surface, which faces to the vertical surface and is curved from the light input/output bore toward the side of the one end of the ferrule.

The guide bore may have a circular shape or rectangular shape in its cross section along a direction perpendicular to an insertion direction of the optical fiber.

The ferrule may comprise a lens which is integrally formed at the end face on the side of the other end.

The ferrule may comprise a material which transmits a UV light.

The ferrule may be provided with a hole or pin for mating with a substrate at the end face on the side of the other end.

The ferrule may comprise two or more of the guide bores.

According to another feature of the invention, an optical module comprises:

an optical fiber; and an optical fiber connecting part comprising:

a ferrule; and a guide bore, which is formed to penetrate through the ferrule from an end face on a side of one end to another end face on a side of another end of the ferrule, and guides the optical fiber inserted from the side of the one end of the ferrule toward the end face on the side of the other end of the ferrule, the guide bore comprising:

an optical fiber insertion hole provided on the side of the one end, through which the optical fiber is inserted into the ferrule;

a light input/output bore provided on the side of the other end of the ferrule and having an inner diameter smaller than an inner diameter of the optical fiber insertion hole, through which a light is input and output at the end face on the side of the other end of the ferrule; and a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore, wherein the shape of the shape-changing bore is changed such that a center axis of the light input/output bore is shifted along a direction for restricting the optical fiber with respect to a center axis of the optical fiber insertion hole.

According to a still another feature of the invention, an optical fiber connecting part comprises:

a ferrule; and a guide bore penetrating through the ferrule and configured to guide an optical fiber to be inserted, the guide bore comprising:

a first bore provided at one end of the ferrule, through which the optical fiber is inserted into the ferrule;

a second bore provided at another end of the ferrule, the second bore having an inner diameter smaller than an inner diameter of the first bore; and an intermediate bore provided between the first bore and the second bore to directly connect between the first bore and the second bore, wherein a center axis of the second bore is shifted from a center axis of the first bore.

ADVANTAGES OF THE INVENTION

According to the present invention, it is possible to provide an optical fiber connecting part and an optical module using the same, by which an end face of an optical fiber can be easily positioned at a predetermined position of one end face of a ferrule with high reproducibility.

BRIEF DESCRIPTION OF THE DRAWINGS

The preferred embodiments according to the invention will be explained below referring to the drawings, wherein:

FIGS. 1A to 1E are explanatory diagram showing an optical fiber connecting part in a first embodiment according to the present invention, wherein FIG. 1A is a top plan view thereof, FIG. 1B is a front view thereof, FIG. 1C is a side view thereof, FIG. 1D is a perspective view thereof, and FIG. 1E is a bottom view thereof;

FIGS. 2A to 2F are explanatory diagram showing an optical module in which an optical fiber of FIG. 24A is connected to the optical fiber connecting part of FIGS. 1A to 1E, wherein FIG. 2A is a top plan view thereof, FIG. 2B is a front view thereof, FIG. 2C is a side view thereof, FIG. 2D is a perspective view thereof, FIG. 2E is a bottom view thereof, and FIG. 2F is an enlarged view of an essential part thereof;

FIGS. 3A to 3C are explanatory diagram showing the optical module in which an optical fiber of FIG. 24A is connected to the optical fiber connecting part of FIGS. 1A to 1E, wherein FIG. 3A is a top plan view thereof, FIG. 3B is a cross sectional view along A-A line thereof, and FIG. 3C is an enlarged view of a part B thereof;

FIGS. 4A and 4B are explanatory diagrams showing an optical fiber to be used in the present invention, wherein FIG. 4A is a lateral cross sectional view of a single-core optical fiber and FIG. 4B is a lateral cross sectional view of a multi-core optical fiber;

FIGS. 5A to 5E are explanatory diagram showing an optical module in which an optical fiber of FIG. 4A is connected to the optical fiber connecting part of FIGS. 1A to 1E, wherein FIG. 5A is a top plan view thereof, FIG. 5B is a front view thereof, FIG. 5C is a side view thereof, FIG. 5D is a perspective view thereof, FIG. 5E is a bottom view thereof, and FIG. 5F is an enlarged view of an essential part thereof;

FIGS. 6A to 6C are explanatory diagram showing the optical module in which an optical fiber of FIG. 4A is connected to the optical fiber connecting part of FIGS. 1A to 1E, wherein FIG. 6A is a top plan view thereof, FIG. 6B is a cross sectional view along A-A line thereof, and FIG. 6C is an enlarged view of a part B thereof;

FIGS. 8A to 8E are explanatory diagram showing an optical module in which an optical fiber is connected to an optical fiber connecting part comprising a lens formed on a bottom surface of the ferrule of FIGS. 1A to 1E, wherein FIG. 8A is a top plan view thereof, FIG. 8B is a front view thereof, FIG. 8C is a side view thereof, FIG. 8D is a perspective view thereof, and FIG. 8E is a bottom view thereof;

FIGS. 9A and 9B are explanatory diagram showing the optical module in which an optical fiber is connected to the optical fiber connecting part of FIGS. 8A to 8E, wherein FIG. 9A is a top plan view thereof and, FIG. 9B is a cross sectional view along A-A line thereof;

FIGS. 10A to 10E are explanatory diagram showing an optical fiber connecting part in a second embodiment according to the present invention, wherein FIG. 10A is a top plan view thereof, FIG. 10B is a perspective view thereof, FIG. 10C is a front view thereof, FIG. 10D is a side view thereof, and FIG. 10E is a bottom view thereof;

FIGS. 11A to 11E are explanatory diagram showing an optical module in which an optical fiber of FIG. 4B is connected to the optical fiber connecting part of FIGS. 10A to 10E, wherein FIG. 11A is a top plan view thereof, FIG. 11B is a perspective view thereof, FIG. 11C is a front view thereof, FIG. 11D is a side view thereof, and FIG. 11E is a bottom view thereof;

FIGS. 12A to 12C are explanatory diagram showing the optical module in which an optical fiber is connected to the optical fiber connecting part of FIGS. 10A to 10E, wherein FIG. 12A is a bottom view thereof, FIG. 12B is a cross sectional view along B-B line thereof, and FIG. 12C is a cross sectional view along A-A line thereof;

FIGS. 13A to 13E are explanatory diagram showing an optical fiber connecting part in a third embodiment according to the present invention, wherein FIG. 13A is a top plan view thereof, FIG. 13B is a perspective view thereof, FIG. 13C is a front view thereof, FIG. 13D is a side view thereof, and FIG. 13E is a bottom view thereof;

FIGS. 14A to 14E are explanatory diagram showing an optical module in which an optical fiber is connected to the optical fiber connecting part of FIGS. 13A to 13E, wherein FIG. 14A is a top plan view thereof, FIG. 14B is a perspective view thereof, FIG. 14C is a front view thereof, FIG. 14D is a side view thereof, and FIG. 14E is a bottom view thereof;

FIGS. 15A to 15E are explanatory diagram showing an optical fiber connecting part in a fourth embodiment according to the present invention, wherein FIG. 15A is a top plan view thereof, FIG. 15B is a perspective view thereof, FIG. 15C is a front view thereof, FIG. 15D is a side view thereof, and FIG. 15E is a bottom view thereof;

FIGS. 16A to 16E are explanatory diagram showing an optical module in which an optical fiber is connected to the optical fiber connecting part of FIGS. 15A to 15E, wherein FIG. 16A is a top plan view thereof, FIG. 16B is a perspective view thereof, FIG. 16C is a front view thereof, FIG. 16D is a side view thereof, FIG. 16E is a bottom view thereof.

FIGS. 17A to 17C are explanatory diagram showing the optical module in which an optical fiber is connected to the optical fiber connecting part of FIGS. 15A to 15E, wherein FIG. 17A is a bottom view thereof, FIG. 17B is a cross sectional view along B-B line thereof, and FIG. 17C is a cross sectional view along A-A line thereof;

FIGS. 18A to 18E are explanatory diagram showing an optical module in which an optical fiber is connected to the optical fiber connecting part of FIGS. 15A to 15E, wherein FIG. 18A is a top plan view thereof, FIG. 18B is a perspective view thereof, FIG. 18C is a front view thereof, FIG. 18D is a side view thereof, FIG. 18E is a bottom view thereof.

FIGS. 19A to 19E are explanatory diagram showing an optical fiber connecting part in a fifth embodiment according to the present invention, wherein FIG. 19A is a top plan view thereof, FIG. 19B is a perspective view thereof, FIG. 19C is a front view thereof, FIG. 19D is a side view thereof, and FIG. 19E is a bottom view thereof;

FIGS. 20A to 20E are explanatory diagram showing an optical fiber connecting part in a variation of the fifth embodiment according to the present invention, wherein FIG. 20A is a top plan view thereof, FIG. 20B is a perspective view thereof, FIG. 20C is a front view thereof, FIG. 20D is a side view thereof, and FIG. 20E is a bottom view thereof;

FIGS. 21A to 21E are explanatory diagram showing an optical module in which an optical fiber is connected to the optical fiber connecting part of FIGS. 19A to 19E, wherein FIG. 21A is a top plan view thereof, FIG. 21B is a perspective view thereof, FIG. 21C is a front view thereof, FIG. 21D is a side view thereof, and FIG. 21E is a bottom view thereof;

FIGS. 22A to 22E are explanatory diagram showing an optical module in which an optical fiber is connected to the optical fiber connecting part of FIGS. 19A to 19E, wherein FIG. 22A is a top plan view thereof, FIG. 22B is a perspective view thereof, FIG. 22C is a front view thereof, FIG. 22D is a side view thereof, and FIG. 22E is a bottom view thereof;

FIGS. 23A to 23E are explanatory diagram showing an optical module in which an optical fiber is connected to the optical fiber connecting part of FIGS. 19A to 19E, wherein FIG. 23A is a top plan view thereof, FIG. 23B is a perspective view thereof, FIG. 23C is a front view thereof, FIG. 23D is a side view thereof, and FIG. 23E is a bottom view thereof;

FIGS. 24A and 24B are explanatory diagrams showing conventional optical fibers, wherein FIG. 24A is a lateral cross sectional view of a single-core optical fiber and FIG. 24B is a lateral cross sectional view of a multi-core optical fiber;

FIGS. 25A to 25C are explanatory diagram showing a conventional optical fiber connecting part, wherein FIG. 25A is a top plan view thereof, FIG. 25B is a side view thereof, and FIG. 25C is a perspective view thereof;

FIGS. 27A to 27D are explanatory diagrams for explaining a problem in the optical fiber connecting part of FIGS. 25A to 25C, wherein FIG. 27A is a front view thereof, FIG. 27B is a perspective view thereof, FIG. 27C is a bottom view thereof, and FIG. 27D is an enlarged view of an essential part thereof.

DETAILED DESCRIPTION OF THE PREFERRED EMBODIMENTS

Figure 4A:
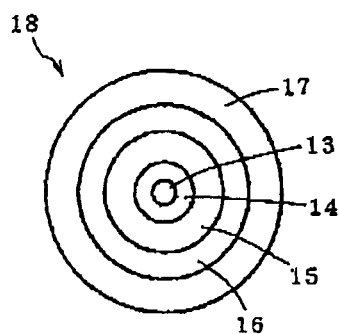

Next, embodiments according to the present invention will be explained below in conjunction with appended drawings.

First Embodiment

FIGS. 1A to 1E are explanatory diagram showing an optical fiber connecting part in the first embodiment according to the present invention, wherein FIG. 1A is a top plan view thereof, FIG. 1B is a front view thereof, FIG. 1C is a side view thereof, FIG. 1D is a perspective view thereof, and FIG. 1E is a bottom view thereof.

(Total Structure of Optical Fiber Connecting Part 1)

Referring to FIGS. 1A to 1E, an optical fiber connecting part 1 in the first embodiment comprises a ferrule 3, a guide bore 4, which is formed to penetrate through the ferrule 3 from an end face on a side of one end to another end face (bottom surface) 2 on a side of another end of the ferrule 3, and guides an optical fiber inserted from the side of the one end of the ferrule 3 toward the end face 2 on the side of the other end of the ferrule 3.

(Guide Bore 4)

The guide bore 4 formed within the ferrule 3 comprises an optical fiber insertion hole 6 provided on the side of the one end, through which the optical fiber is inserted into the ferrule 3, a light input/output bore 5, which is provided on the side of the other end of the ferrule 3 and has an inner diameter smaller than an inner diameter of the optical fiber insertion hole 6, and through which a light is input and output at the end face 2 on the side of the other end of the ferrule 3, and a shape-changing bore 7 provided between the optical fiber insertion hole 6 and the light input/output bore 5, a shape of which is changed such that an inner diameter of the shape-changing bore 7 is slowly reduced along a longitudinal direction from the optical fiber insertion hole 6 toward the light input/output bore 5. The optical fiber insertion hole 6, the shape-changing bore 7, and the light input/output bore 5 are continuously formed and they are communicated with each other.

(Shape-Changing Bore 7)

The configuration of the shape-changing bore 7 is changed in such a manner that a center axis of the light input/output bore 5 is shifted along a direction for restricting the optical fiber (i.e. restricting direction) with respect to a center axis of the optical fiber insertion hole 6, as indicated by arrows in FIG. 1B. In other words, in the optical fiber connecting part 1, a center position 8 of the optical fiber insertion hole 6 to which the optical fiber is inserted and a center position 9 of the light input/output bore 5 which inputs and outputs the light of the optical fiber to the outside of the ferrule 3 are shifted from each other.

In other words, the optical fiber connecting part 1 comprises the ferrule 3, and the guide bore 4 penetrating through the ferrule 3 and configured to guide the optical fiber to be inserted. The guide bore 4 comprises a first bore (optical fiber insertion hole) 6 provided at one end of the ferrule 3, through which the optical fiber is inserted into the ferrule 3, a second bore (light input/output bore) 5 provided at another end of the ferrule 3, the second bore 5 having an inner diameter smaller than an inner diameter of the first bore 6, and an intermediate bore (shape-changing bore) 7 provided between the first bore 6 and the second bore 5 to directly connect between the first bore 6 and the second bore 5, in which a center axis of the second bore 5 is shifted from a center axis of the first bore 6.

Alternatively, the configuration of the shape-changing bore 7 may be varied in such a manner that the center axis of the light input/output bore 5 is shifted along a vertical direction with respect to the center axis of the optical fiber insertion hole 6.

It is preferable that an inclination angle of an inner surface of the shape-changing bore 7 with respect to an insertion direction of the optical fiber is varied in a circumferential direction as shown in FIGS. 1B to 1D.

In addition, the shape-changing bore 7 is configured to slowly and directly connect between the light input/output bore 5 and the optical fiber insertion hole 6. If this shape-changing bore 7 is not provided, a level difference (step portion) will be provided in the guide bore 4, since a diameter of the optical fiber insertion hole 6 is different from a diameter of the light input/output bore 5. If the level difference is formed in the guide bore 4, a tip end (nose) of the optical fiber will be caught by the level difference when the optical fiber is inserted into the guide bore 4, so that it will be difficult to insert the optical fiber until the light input/output bore 5. In other words, the shape-changing bore 7 is provided to facilitate the insertion of the optical fiber into the guide bore 4.

The bottom surface (the light input and output end face) 2 of the ferrule 3 on the side of the other end of the ferrule 3 is provided to be connected to e.g. the conventional ferrule as shown in FIG. 25A to 25C or an optical device mounted on a substrate (not shown). It is preferable that the bottom surface 2 is connected to the substrate via a member such as lens base.

(The Optical Fiber Insertion Hole 6)

The optical fiber insertion hole 6 is slowly increased in diameter toward the side of the one end of the ferrule 3 to which the optical fiber inserted (i.e. upper part in FIGS. 1B to 1D), so that the optical fiber can be inserted easily into the optical fiber insertion hole 6.

(Optical Module 26)

Figure 24A:
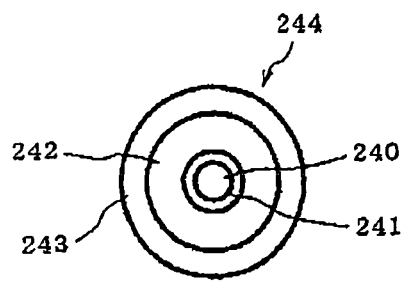
Figure 24B:
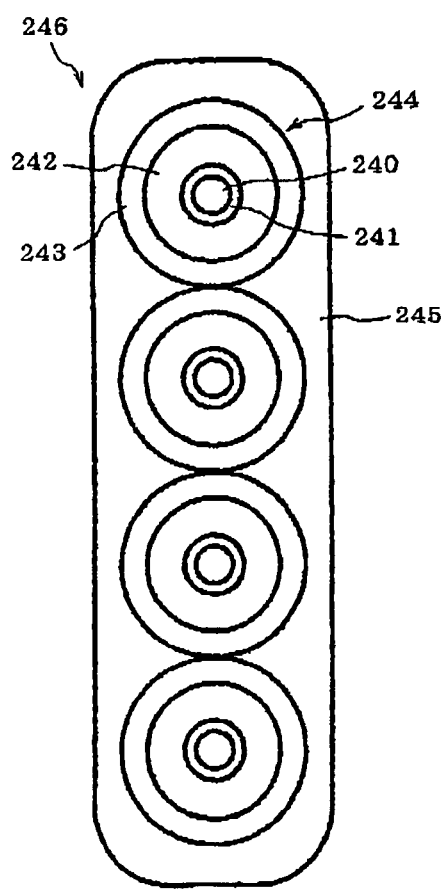
Figure 26:
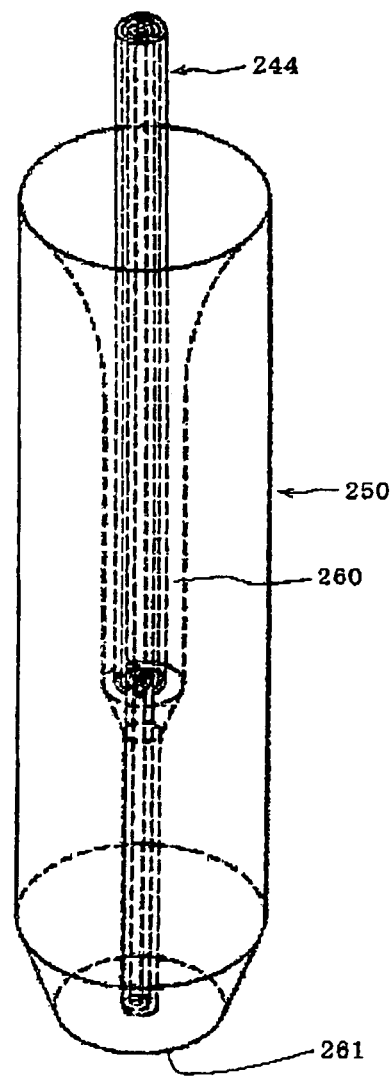
FIG. 26 is an explanatory diagram showing a conventional optical module in which the single-core optical fiber of FIG. 24A is connected to the optical fiber connecting part of FIGS. 25A to 25C.
Figure 27A:
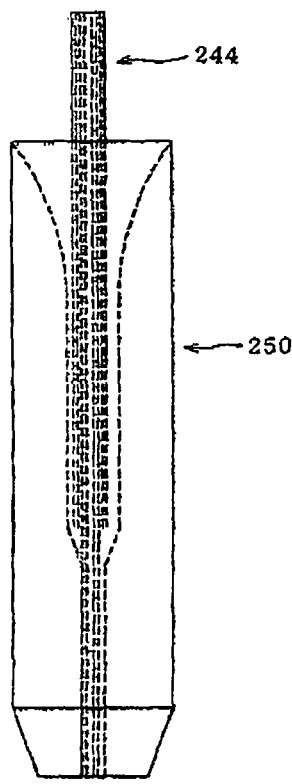
Figure 27B:
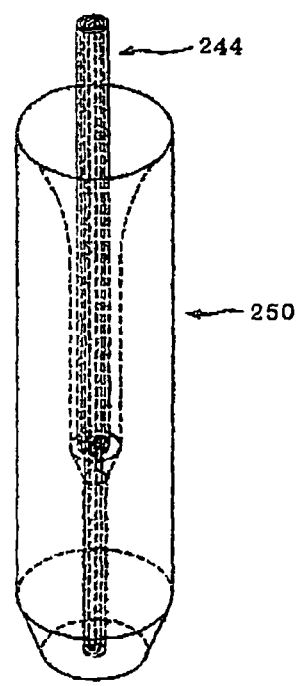
Figure 27C:
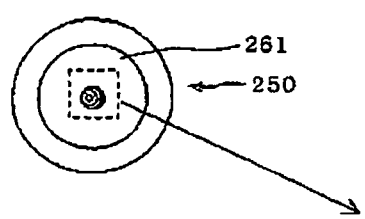
Figure 27D:
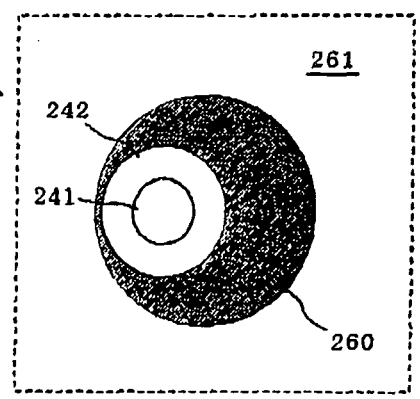

FIGS. 2A to 2F are explanatory diagram showing an optical module 26 in which a single-core optical fiber 244 of FIG. 24A is connected to the optical fiber connecting part 1 of FIGS. 1A to 1E, wherein FIG. 2A is a top plan view thereof, FIG. 2B is a front view thereof, FIG. 2C is a side view thereof, FIG. 2D is a perspective view thereof, FIG. 2E is a bottom view thereof, and FIG. 2F is an enlarged view of an essential part thereof.

In FIG. 2F, a white arrow indicates a direction of restricting the single-core optical fiber 244.

FIGS. 3A to 3C are explanatory diagram showing the optical module 26 in which the single-core optical fiber 244 of FIG. 24A is connected to the optical fiber connecting part 1 of FIGS. 1A to 1E, wherein FIG. 3A is a top plan view thereof, FIG. 3B is a cross sectional view along A-A line thereof, and FIG. 3C is an enlarged view of a part B thereof.

Referring to FIGS. 2A to 2F and 3A to 3C, when the single-core optical fiber 244 is connected to the optical fiber connecting part 1, the coating layer (the low Young modulus layer 242 and the high Young modulus layer 243 of FIG. 24A) of the single-core optical fiber 244 is firstly removed, and the clad 241 is exposed to the outside from the single-core optical fiber 244. Subsequently, the guide bore 4 is filled with the adhesive 10. Thereafter, the single-core optical fiber 244 is inserted into the guide bore 4 which is filled with the adhesive 10. After insertion of the single-core optical fiber 244, the adhesive 10 filling the guide bore 4 is cured. Thereafter, the bottom surface 2 of the ferrule 3 is polished, and an end face of the core 240 and an end face of the clad 241 of the single-core optical fiber 244 are exposed on the same surface (plane) as that of the bottom surface 2. According to the above process, the single-core optical fiber 244 is connected and bonded to the optical fiber connecting part 1.

In the optical fiber connecting part 1, the center position 9 of the light input/output bore 5 and the center position 8 of the optical fiber insertion hole 6 are geometrically shifted from each other, the single-core optical fiber 244 is fixed in bent state within the ferrule 3. In other words, the single-core optical fiber 244 is bent at a connecting part (i.e. the shape-changing bore 7) between the light input/output bore 5 and the optical fiber insertion hole 6, so that it is possible to restrict the position of the single-core optical fiber 244 in a direction toward the light input/output bore 5 by a bending stress, as shown in FIG. 2F.

As described above, according to the optical fiber connecting part 1, it is possible to dispose the end face of the optical fiber at a predetermine position of the end face 2 of the ferrule 3 easily with high reproducibility.

However, when the single-core optical fiber 244 from which the coating layer is removed is used, there is a high possibility that the single-core optical fiber 244 is broken by bending, since the coating layer thereof is removed. It is because that a glass surface is damaged when the coating layer is removed, so that a defect progresses due to the bending stress, thereby causing the breakage of the single-core optical fiber 244. Particularly, as shown in FIG. 3C, the glass and the ferrule 3 contact with each other at contact points 11, 12 of the clad 241 of the single-core optical fiber 244, which contact with an inner surface of the light input/output bore 5, so that the bending stress is concentrated to the contact points 11, 12. Therefore, the possibility of breaking the single-core optical fiber 244 is further increased.

Further, in the case where the single-core optical fiber 244 (the conventional optical fiber) is connected to the optical fiber connecting part 1, Young modulus as a first coating layer (i.e. the inner layer) of the single-core optical fiber 244 is set to be low, for the purpose of reducing the micro bending loss by a lateral pressure along a longitudinal direction of the optical fiber 244. Therefore, it is difficult to remove only the second coating layer (i.e. the outer layer).

(Optical Fibers to be Used in the Present Invention)

Figure 4B:
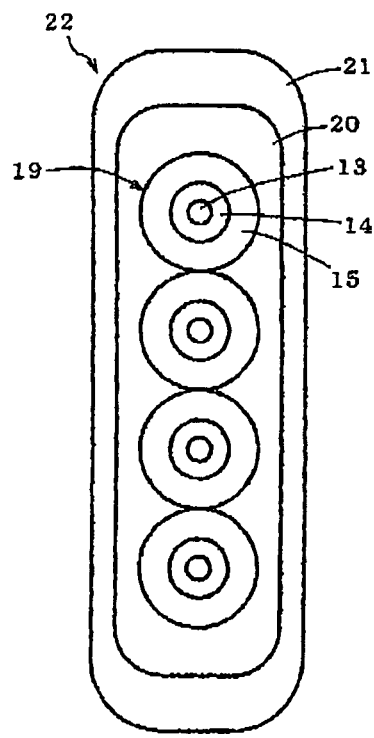

FIGS. 4A and 4B are explanatory diagrams showing optical fibers to be used in the present invention, wherein FIG. 4A is a lateral cross sectional view of a single-core optical fiber 18 and FIG. 4B is a lateral cross sectional view of a multi-core optical fiber 22.

For the reasons as described above, it is preferable to use the optical fibers as shown in FIGS. 4A and 4B, so as to arrange the optical fiber with high precision without exposing a glass part (clad part) in the optical fiber from the bottom surface 2 of the ferrule 3.

In the present invention, following optical fibers may be used.

FIG. 4A shows the single core optical fiber 18 comprising a core 13, a clad 14 formed around an outer periphery of the core 13, a first high Young modulus layer 15 formed around an outer periphery of the clad 14, a low Young modulus layer 16 formed around an outer periphery of the high Young modulus layer 15, and a second high Young modulus layer 17 formed around an outer periphery of the low Young modulus layer 16.

FIG. 4B shows the multi-core optical fiber (tape-like optical fiber) 22 comprising a plurality of single-core optical fibers 19, each of which comprises a core 13, a clad 14 formed around an outer periphery of the core 13, and a first high Young modulus layer 15 formed around an outer periphery of the clad 14, the single-core optical fiber 19 being aligned in one column, a low Young modulus layer 20, and a second high Young modulus layer 21, in which the low Young modulus layer 20 and the second high Young modulus layer 21 sequentially cover the single-core optical fibers 19 in this order.

The first high Young modulus layer 15 preferably has Young modulus of 100 MPa or more, with considering polishing property at the bottom surface 2 of the ferrule 3, suppression of the deformation of the coating layer configuration due to the bending stress within the ferrule 3, and the like.

Each of the low Young modulus layers 16, 20 preferably has Young modulus of 10 MPa or less, for the purpose of providing a coating removal property of the low Young modulus layers, 16, 20, relaxing stress concentration to a coating-removed part when bending occurs in the optical fiber within the ferrule 3, and reducing the micro bending loss due to a lateral pressure outside the ferrule 3.

Each of the second high Young modulus layers 17, 21 preferably has Young modulus of 50 MPa or more, for the purpose of maintaining the configuration of the optical fiber.

Further, each of outermost coating layers (i.e. the second high Young modulus layers 17, 21) preferably has flame retardant property. More preferably, all of these coating layers have the flame retardant property.

When using the optical fiber having the aforementioned configuration (e.g. the single-core optical fiber 18), the optical fiber 18 is inserted into the optical fiber connecting part 1 after removing the coating layers at the tip end other than the first high Young modulus layer 15.

FIGS. 5A to 5E are explanatory diagrams showing an optical module in which the single-core optical fiber 18 of FIG. 4A is connected to the optical fiber connecting part 1 of FIGS. 1A to 1E, wherein FIG. 5A is a top plan view thereof, FIG. 5B is a front view thereof, FIG. 5C is a side view thereof, FIG. 5D is a perspective view thereof, FIG. 5E is a bottom view thereof, and FIG. 5F is an enlarged view of an essential part thereof.

According to this structure, it is possible to restrict the position of the single-core optical fiber 18 at the bottom surface 2 of the ferrule 3 without exposing the glass part of the single-core optical fiber 18 inside the ferrule 3 as shown in FIGS. 5A to 5F. The restriction direction of the optical fiber 18 is indicated by a white arrow.

Figure 6A:
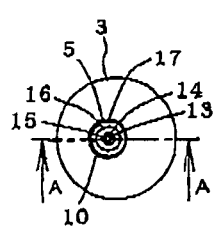
Figure 6B:
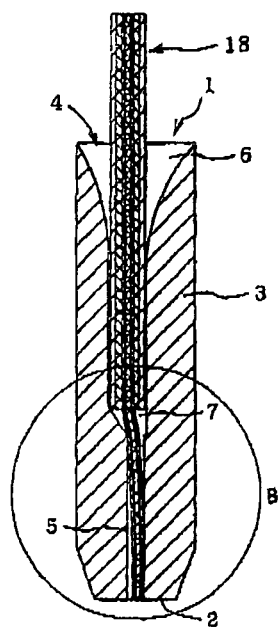
Figure 6C:
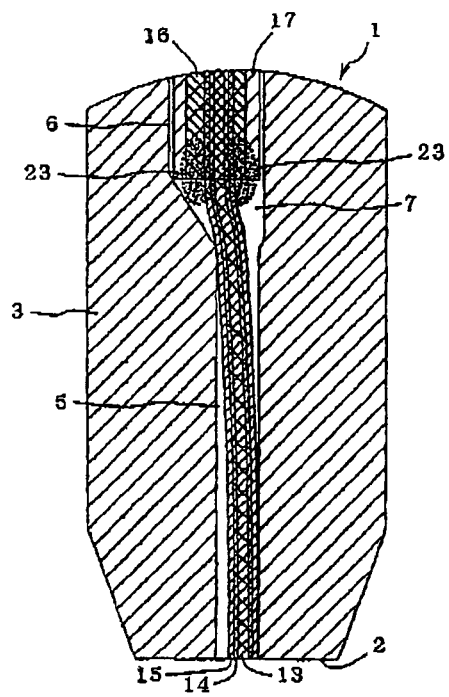

FIGS. 6A to 6C are explanatory diagram showing the optical module in which the single-core optical fiber 18 of FIG. 4A is connected to the optical fiber connecting part 1 of FIGS. 1A to 1E, wherein FIG. 6A is a top plan view thereof, FIG. 6B is a cross sectional view along A-A line thereof, and FIG. 6C is an enlarged view of a part B thereof.

At this time, as shown in FIGS. 6A to 6C, it is possible to prevent the glass part of the single-core optical fiber 18 from directly contacting with the ferrule 3 by the first coating layer (i.e. the first high Young modulus layer 15). Although the bending stress is concentrated to a local bending part 23 from which the second coating layer (i.e. the low Young modulus layer 16) and the third coating layer (i.e. the second high Young modulus layer 17) are removed, it is possible to relax the stress concentration. It is because that the second coating layer has the low Young modulus.

(Condition for Restricting the Optical Fiber)

Figure 7:
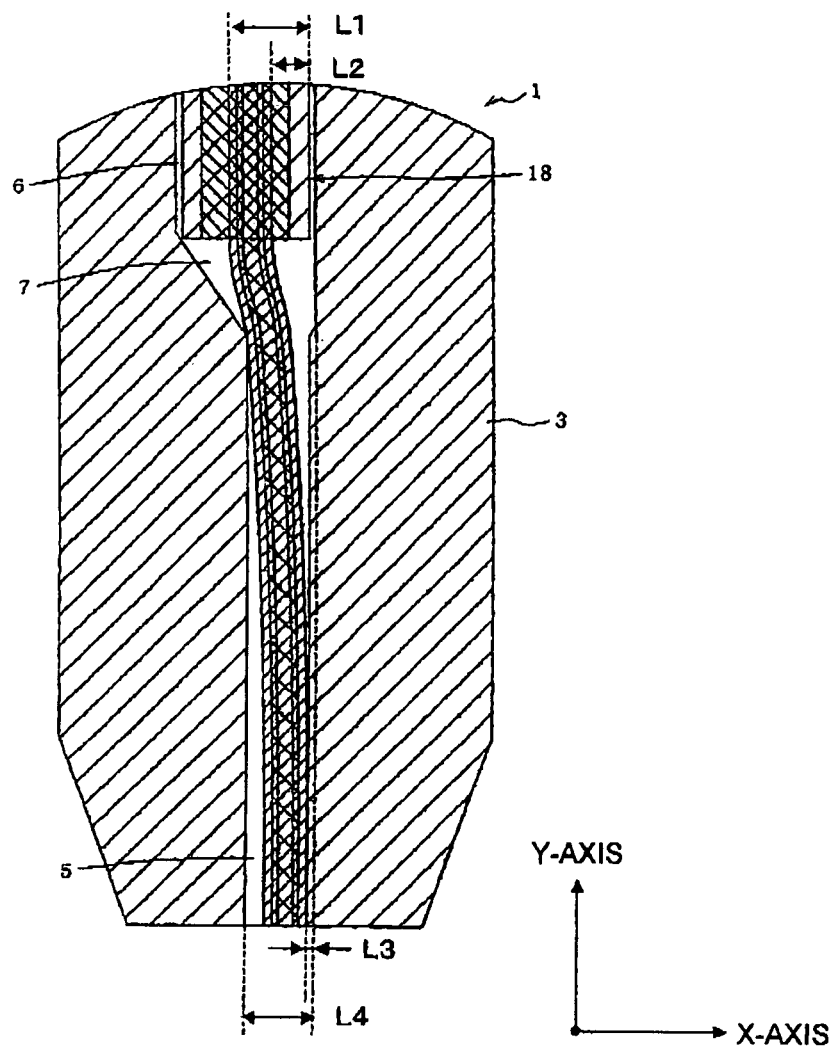
FIG. 7 is an explanatory diagram showing a condition under which the optical fiber of FIG. 4A is restricted by the ferrule when the optical fiber of FIG. 4A is connected to the optical fiber connecting part of FIGS. 1A to 1E.

FIG. 7 is an explanatory diagram showing a condition under which the single-core optical fiber 18 of FIG. 4A is restricted by the ferrule 3 when the single-core optical fiber 18 of FIG. 4A is connected to the optical fiber connecting part 1 of FIGS. 1A to 1E.

In the optical fiber connecting part 1 of the present invention, the condition for restricting the optical fiber 18 within the ferrule 3 is to satisfy $L1>L4$ and $L2>L3$ in the configuration as shown in FIG. 7, wherein $L1$ is a maximum distance between an outer surface of the outermost coating layer (high Young modulus layer 17) and an outer surface of the first coating layer (high Young modulus layer 15), $L2$ is a minimum distance between the outer surface of the outermost coating layer (high Young modulus layer 17) and an outer surface of the first coating layer (high Young modulus layer 15), $L3$ is a shortest distance between an inner surface of the optical fiber insertion hole 6 and an inner surface of the light input/output bore 5 along an X-axis direction, and $L4$ is a sum of the shortest distance $L3$ and a diameter of the light input/output bore 5.

The optical fiber 18 is restricted inside the ferrule 3 by satisfying the above condition.

Herein, it is preferable that a configuration of a space between the light input/output bore 5 and the optical fiber insertion hole 6 in a Y-axis direction is slowly varied such that the single-core optical fiber 18 from which the second coating layer (low Young modulus layer 16) and the third coating layer (high Young modulus layer 17) are removed can be easily inserted into the optical fiber insertion hole 6.

(Variation)

FIGS. 8A to 8E are explanatory diagram showing an optical module in which an optical fiber 25 is connected to an optical fiber connecting part comprising an optical lens 24 formed on a bottom surface 2 of the ferrule 3 of FIGS. 1A to 1E, wherein FIG. 8A is a top plan view thereof, FIG. 8B is a front view thereof, FIG. 8C is a side view thereof, FIG. 8D is a perspective view thereof, and FIG. 8E is a bottom view thereof.

Figure 9A:
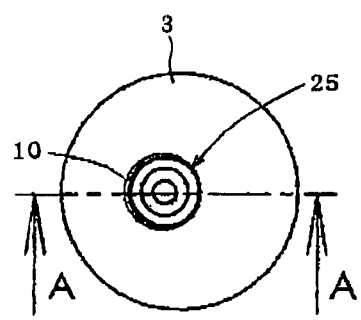
Figure 9B:
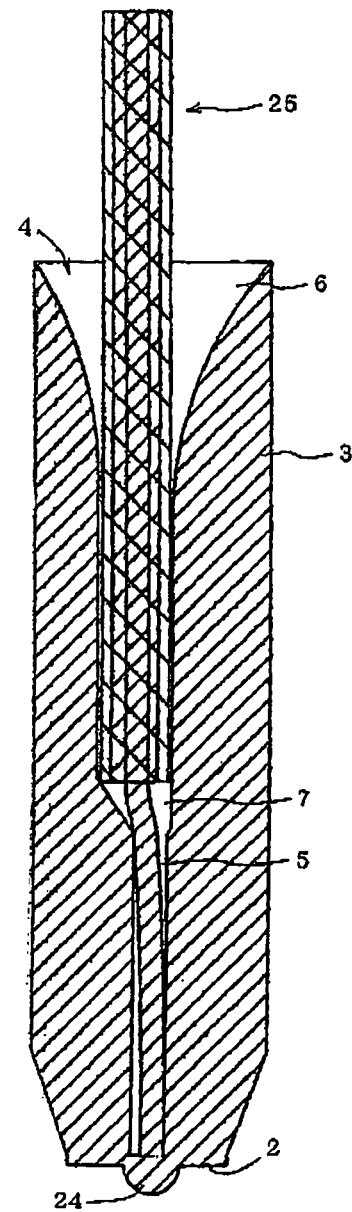

FIGS. 9A and 9B are explanatory diagram showing the optical module in which the optical fiber 25 is connected to the optical fiber connecting part 1a of FIGS. 8A to 8E, wherein FIG. 9A is a top plan view thereof and, FIG. 9B is a cross sectional view along A-A line thereof.

In addition, an essential configuration of the optical fiber connecting part 1 in the first embodiment may be applied to a configuration in which the optical lens 24 is integrally formed on the bottom surface 2 of the ferrule 3 and the bottom surface 2 faces to the end face of the guide bore 4 as shown in FIGS. 8A to 8E, and 9A and 9B. At this time, a material of the ferrule 3 preferably comprises a material transmitting the light such as polyetherimide. For example, "Ultem" (trademark) may be used for the ferrule 3. For fixing the ferrule 3 to the optical fiber 25 (the single-core optical fiber 18, 244 or the multi-core optical fiber 22, 246), thermosetting resin or UV (ultraviolet)-curing resin may be used. When the UV-curing resin is used for fixing the optical fiber 25, the material of the ferrule 3 preferably comprises a material transmitting the UV light, e.g. acryl resin, polycarbonate resin, acrylonitrile-butadiene-styrene copolymerization synthetic resin (ABS resin), and polyphenylene sulfide resin (PPS resin). It is because that the UV-curing resin cannot be cured unless the ferrule 3 transmits the UV light. In particular, from the viewpoint of flame resistance, it is preferable to use polycarbonate resin, ABS resin, or PPS resin.

Advantages of the First Embodiment

In brief, according to the optical fiber connecting part 1 in the first embodiment, the center position 8 of the optical fiber insertion hole 6, to which the optical fiber is inserted, and the center position 9 of the light input/output bore 5, through which the light is input from and output to the outside of the ferrule 3, are shifted from each other. Therefore, it is possible to forcibly (intentionally) bend the optical fiber within the ferrule 3, thereby installing the end face of the optical fiber to be restricted to a predetermined position of the light input/output bore 5 at the bottom surface 2 of the ferrule 3. As described above, since it is possible to install the optical fiber with restricting the end face of the optical fiber at a constant position, it is possible to fabricate the optical module with high reproducibility, regardless the dimensions of the light input/output bore 5. Therefore, manufacturing yield can be improved and manufacturing cost can be also reduced.

Second Embodiment

Next, an optical fiber connecting part 30 in the second embodiment will be explained below.

Figure 10A:
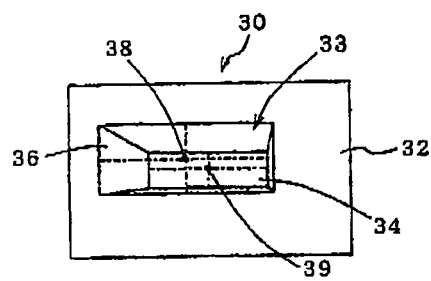
Figure 10B:
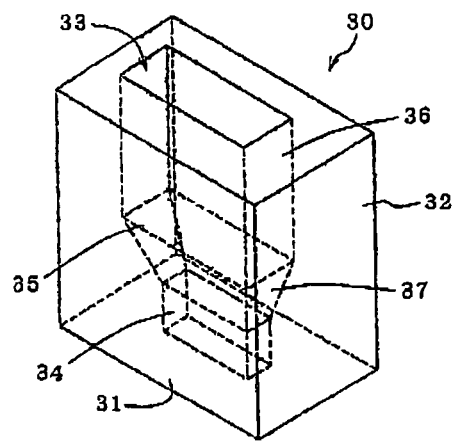
Figure 10C:
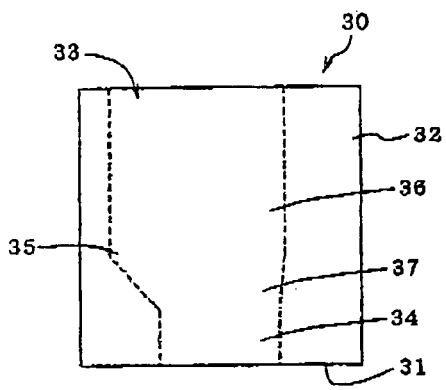
Figure 10D:
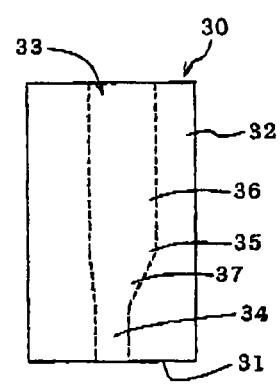
Figure 10E:
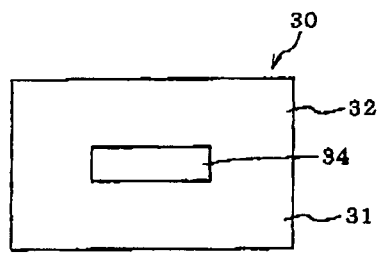

FIGS. 10A to 10E are explanatory diagram showing an optical fiber connecting part 30 in the second embodiment according to the present invention, wherein FIG. 10A is a top plan view thereof, FIG. 10B is a perspective view thereof, FIG. 10C is a front view thereof, FIG. 10D is a side view thereof, and FIG. 10E is a bottom view thereof.

Referring to FIGS. 10A to 10E, the optical fiber connecting part 30 in the second embodiment is configured to provide a connector using a multi-core optical fiber (tape-like optical fiber) 22.

(Total Structure of the Optical Fiber Connecting Part 30)

Similarly to the optical fiber connecting part 1 in the first embodiment, the optical fiber connecting part 30 in the second embodiment comprises a ferrule 32, a guide bore 33 which is formed to penetrate through the ferrule 32 from an end face on a side of one end (upper part in FIGS. 10B to 10D) to another end face (bottom surface) 31 on a side of the other end of the ferrule 32, and guides a tape-like optical fiber inserted from the side of the one end toward the end face 31 on the side of the other end.

(Guide Bore 33)

The guide bore 33 formed within the ferrule 32 comprises an optical fiber insertion hole 36 provided on the side of the one end, through which the tape-like optical fiber 22 is inserted into the ferrule 32, a light input/output bore 34, which is provided on the side of the other end of the ferrule 32 and has an inner diameter smaller than an inner diameter of the optical fiber insertion hole 36, and through which a light is input and output at the end face 31 on the side of the other end of the ferrule 32, and a shape-changing bore 35 provided between the optical fiber insertion hole 36 and the light input/output bore 34, a shape of which is changed such that an inner diameter of the shape-changing bore 35 is slowly reduced along a longitudinal direction from the optical fiber insertion hole 36 toward the light input/output bore 34. The optical fiber insertion hole 36, the shape-changing bore 35, and the light input/output bore 34 are continuously formed and they are communicated with each other.

(Shape-Changing Bore 35)

The configuration of the shape-changing bore 35 is changed in such a manner that a center axis (a center position 38) of the light input/output bore 34 is shifted along a direction for restricting the optical fiber (i.e. restricting direction) with respect to a center axis (a center position 39) of the optical fiber insertion hole 36, as indicated by arrows in FIG. 10A.

More concretely, the optical fiber connecting part 30 comprises the ferrule 32 having a bottom surface 31 which is horizontal with respect to a substrate (not shown), and the guide bore 33 formed within the ferrule 32 for installing the tape-like optical fiber 22, by which an end face of the tape-like optical fiber 22 is connected to an arrayed optical device provided on the substrate.

So as to input the light output from the tape-like optical fiber 22 to the arrayed optical device and input the light output from the arrayed optical device to the tape-like optical fiber 22, the guide bore 33 comprises the light input/output bore 34, which has a rectangular cross section and holds the end face of the tape-like optical fiber 22 to face to the arrayed optical device at the bottom surface 31 of the ferrule 32 facing to the substrate, the optical fiber insertion hole 36 having the inner diameter greater than the inner diameter of the light input/output bore 34, the center position 38 shifted from the center position 39 of the light input/output bore 34, and an opening 35 having a rectangular cross section which guides the insertion of the tape-like optical fiber 22, and the shape-changing bore 35 which slowly guides the tape-like optical fiber 22 inserted from the optical fiber insertion bore 36 toward the light input/output bore 34.

In other words, similarly to the optical fiber connecting part 1 of FIGS. 1A to 1E, in the optical fiber connecting part 30, the center position 38 of the optical fiber insertion hole 36 to which the optical fiber is inserted is shifted along a thickness direction and width direction of the tape-like optical fiber 22 from the center position 39 of the light input/output bore 34 which inputs and outputs the light of the optical fiber to the outside of the ferrule 32.

Further, similarly to the optical fiber connecting part 1, the configuration of the shape-changing bore 35 is preferably varied in such a manner that the center axis of the light input/output bore 34 is shifted along a direction for restricting the tape-like optical fiber 22 inserted into the guide bore 33 (restriction direction) with respect to the center axis of the optical fiber insertion hole 36.

It is preferable that an inclination angle of an inner surface 37 of the shape-changing bore 35 with respect to an insertion direction of the tape-like optical fiber 22 is varied in a circumferential direction as shown in FIGS. 10A to 10D.

(Optical Module 40)

Figure 11A:
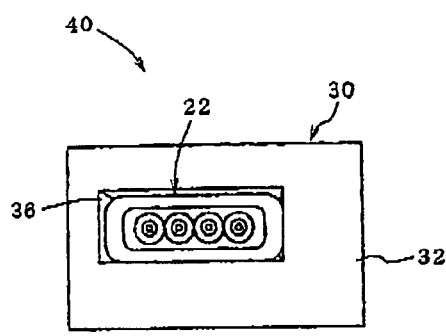
Figure 11B:
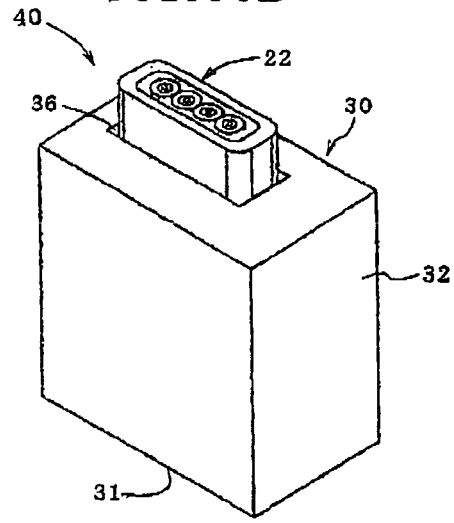
Figure 11C:
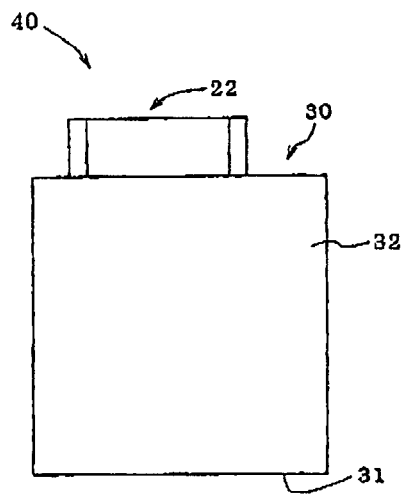
Figure 11D:
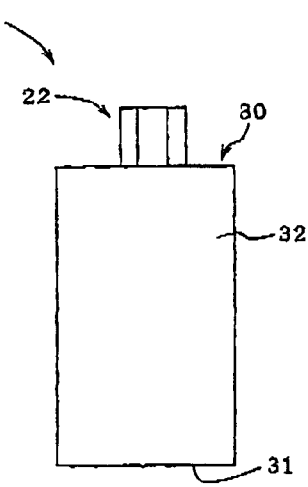
Figure 11E:
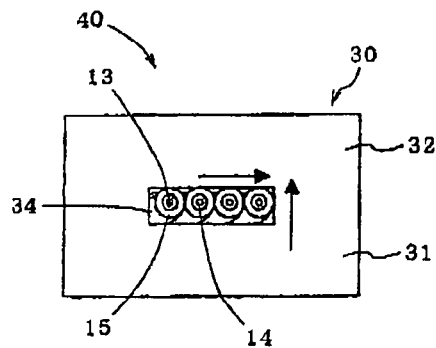

FIGS. 11A to 11E are explanatory diagram showing an optical module 40 in which the tape-like optical fiber 22 of FIG. 4B is connected to the optical fiber connecting part 30 of FIGS. 10A to 10E, wherein FIG. 11A is a top plan view thereof, FIG. 11B is a perspective view thereof, FIG. 11C is a front view thereof, FIG. 11D is a side view thereof, and FIG. 11E is a bottom view thereof.

FIGS. 12A to 12C are explanatory diagram showing the optical module 40 in which the tape-like optical fiber 22 is connected to the optical fiber connecting part 30 of FIGS. 10A to 10E, wherein FIG. 12A is a bottom view thereof, FIG. 12B is a cross sectional view along B-B line thereof, and FIG. 12C is a cross sectional view along A-A line thereof.

In FIG. 12A, the restriction directions (left horizontal direction and right upper direction) are indicated by arrows.

As described above, it is possible to obtain following effect by shifting the center axis of the optical fiber insertion bore 36 from the center axis of the light input/output bore 34. Namely, when using the tape-like optical fiber 22, the tape-like optical fiber 22 is inserted into the guide bore 33 of the optical fiber connecting part 30 after removing the low Young modulus layer 20 and the second high Young modulus layer 21 at a tip end of the tape-like optical fiber 22. Then, the tape-like optical fiber 22 is naturally bent within the ferrule 32, positions of respective cores 13 of the tape-like optical fiber 22 are restricted to a corner of the light input/output bore 34 at the bottom surface 31 of the ferrule 32, so that it is possible to align the respective cores 13 of the tape-like optical fiber 22 with high precision.

(Condition for Restricting the Tape-Like Optical Fiber 22)

In the optical fiber connecting part 30 of the present invention, the condition for restricting the tape-like optical fiber 22 inside of the ferrule 32 in both of the X-axis direction and Y-axis direction is to satisfy all of L1X>L4X, L2X>L3X, L1Y>L4Y, and L2Y>L3Y in the configuration as shown in FIG. 12A to 12C, wherein L1X is a maximum distance between an outer surface of the outermost coating layer (the second high Young modulus layer 21) and an outer surface of the first coating layer (the first high Young modulus layer 15) along the X-axis direction of FIG. 12A, L2X is a minimum distance between the outer surface of the outermost coating layer (the second high Young modulus layer 21) and the outer surface of the first coating layer (the first high Young modulus layer 15) along the X-axis direction of FIG. 12A, L3X is a shortest distance between an inner surface of the optical fiber insertion hole 36 and an inner surface of the light input/output bore 34 along the X-axis direction of FIG. 12A, L4X is a sum of the shortest distance L3X and a diameter of the light input/output bore 34 along the X-axis direction of FIG. 12A, L1Y is a maximum distance between an outer surface of the outermost coating layer (the second high Young modulus layer 21) and an outer surface of the first coating layer (the first high Young modulus layer 15) along the Y-axis direction of FIG. 12A, L2Y is a minimum distance between the outer surface of the outermost coating layer (the second high Young modulus layer 21) and the outer surface of the first coating layer (the first high Young modulus layer 15) along the Y-axis direction of FIG. 12A, L3Y is a shortest distance between an inner surface of the optical fiber insertion hole 36 and an inner surface of the light input/output bore 34 along the Y-axis direction of FIG. 12A, and L4Y is a sum of the shortest distance L3Y and a diameter of the light input/output bore 34 along the Y-axis direction of FIG. 12A.

The tape-like optical fiber 22 is restricted inside the ferrule 32 by satisfying the above condition.

Advantages of the Second Embodiment

Similarly to the optical fiber connecting part 1 in the first embodiment, according to the optical fiber connecting part 30 in the second embodiment, it is possible to install the end face of the tape-like optical fiber 22 to be restricted to a predetermined position of the light input/output bore 34 at the bottom surface 31 of the ferrule 32. As described above, since it is possible to install the tape-like optical fiber 22 with restricting the end face of the tape-like optical fiber 22 at a constant position, it is possible to fabricate the optical module 40 with high reproducibility, regardless the dimensions of the light input/output bore 34. Therefore, manufacturing yield can be improved and manufacturing cost can be also reduced.

Third Embodiment

Next, an optical fiber connecting part 50 in the third embodiment will be explained below.

Figure 13A:
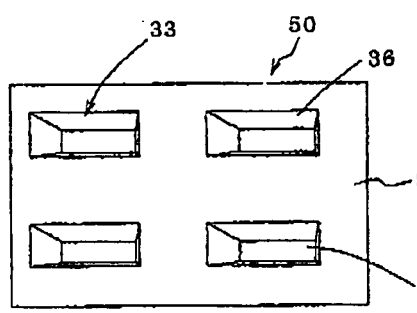
Figure 13B:
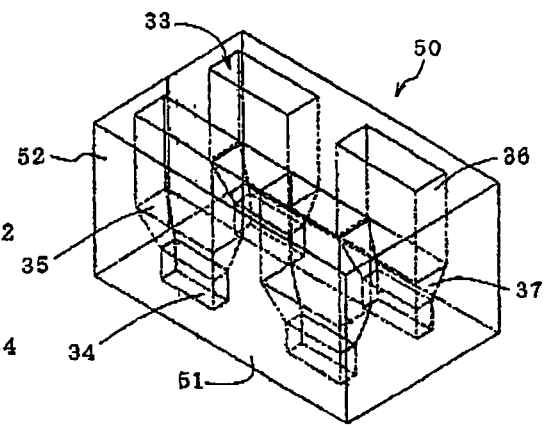
Figure 13C:
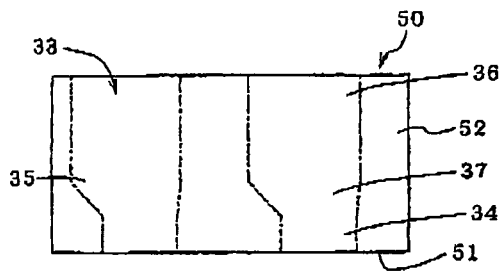
Figure 13D:
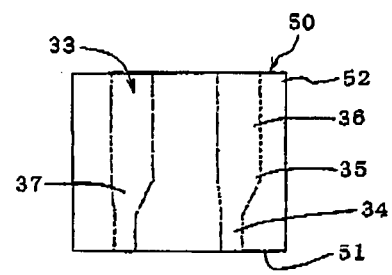
Figure 13E:
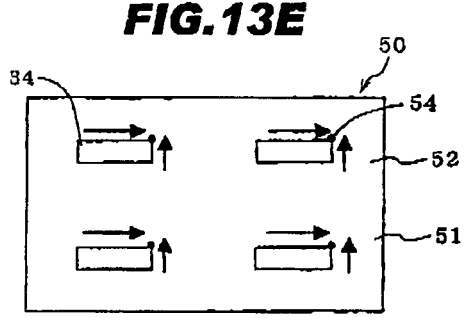

FIGS. 13A to 13E are explanatory diagram showing an optical fiber connecting part 50 in the third embodiment according to the present invention, wherein FIG. 13A is a top plan view thereof, FIG. 13B is a perspective view thereof, FIG. 13C is a front view thereof, FIG. 13D is a side view thereof, and FIG. 13E is a bottom view thereof.

In FIG. 13E, the restriction directions (left horizontal direction and right upper direction) are indicated by arrows. The same reference numerals are assigned to similar parts in the optical fiber connecting part 40 in the second embodiment.

Referring to FIGS. 13A to 13E, the optical fiber connecting part 50 in the third embodiment comprises a ferrule 52 having a bottom surface 51 which is horizontal with respect to a substrate (not shown), and four guide bores 33 formed within the ferrule 52, by which four sets of tape-like optical fibers 22 are collectively connected to respective arrayed optical device on the substrate.

(Optical Module 53)

Figure 14A:
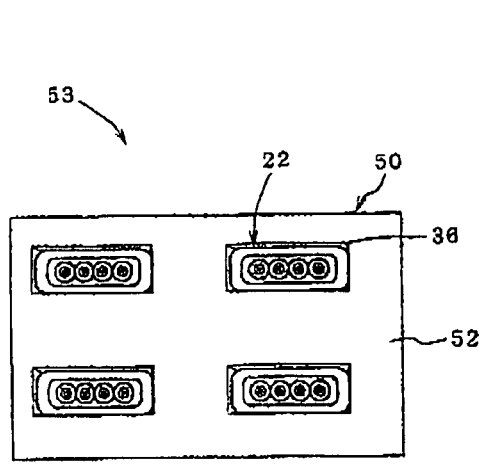
Figure 14B:
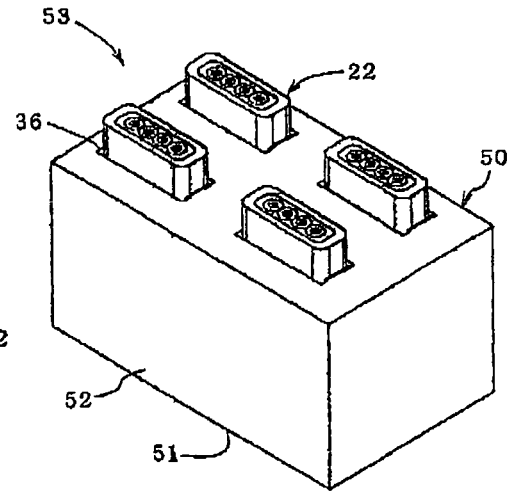
Figure 14C:
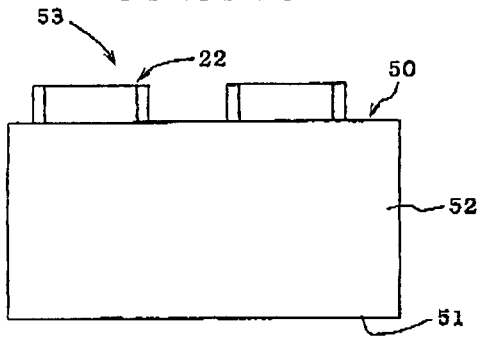
Figure 14D:
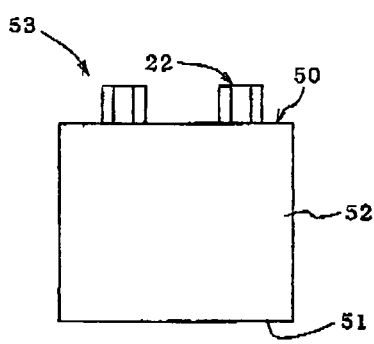
Figure 14E:
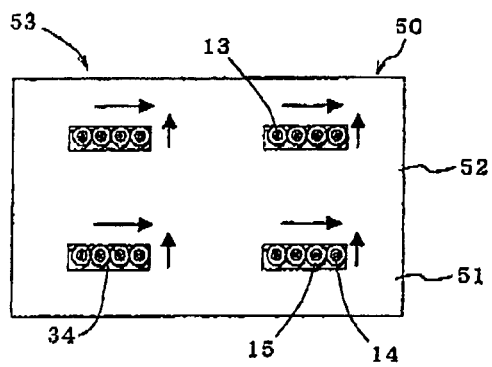

FIGS. 14A to 14E are explanatory diagram showing an optical module 53 in which the tape-like optical fibers 22 are connected and bonded to the respective guide bores 33 of the optical fiber connecting part 50 of FIGS. 13A to 13E, wherein FIG. 14A is a top plan view thereof, FIG. 14B is a perspective view thereof, FIG. 14C is a front view thereof, FIG. 14D is a side view thereof, and FIG. 14E is a bottom view thereof. In FIG. 14E, directions of restricting the tape-like optical fibers 22 are indicated by arrows.

Advantages of the Third Embodiment

Referring to FIGS. 14A to 14E, according to the optical fiber connecting part 50 in the third embodiment, it is possible to arrange sixteen cores 13 by bonding the tape-like optical fibers 22 to the optical fiber connecting part 50. Therefore, it is possible to arrange the cores 13 with high precision regardless the dimensions of the light input/output bores 34 at the bottom surface 51, by forming only an apex position 54 of each light input/output bore 34 for restricting the core 13 as shown in FIG. 13E with high precision. Herein, it is further possible to arrange the cores 13 with higher precision at the bottom surface 51 by providing the high Young modulus layer 15 of each single-core optical fiber (including the core 13, the clad 14, and the high Young modulus layer 15) at the bottom surface 51 with an outer diameter same as a pitch for arranging the cores 13.

Fourth Embodiment

Next, an optical fiber connecting part 60 in the fourth embodiment will be explained below.

Figure 15A:
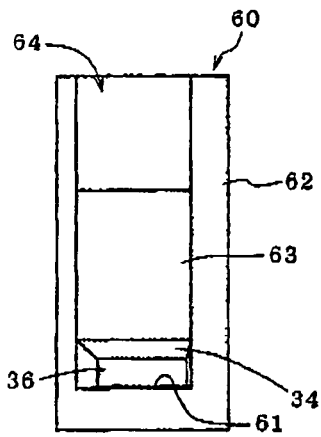
Figure 15B:
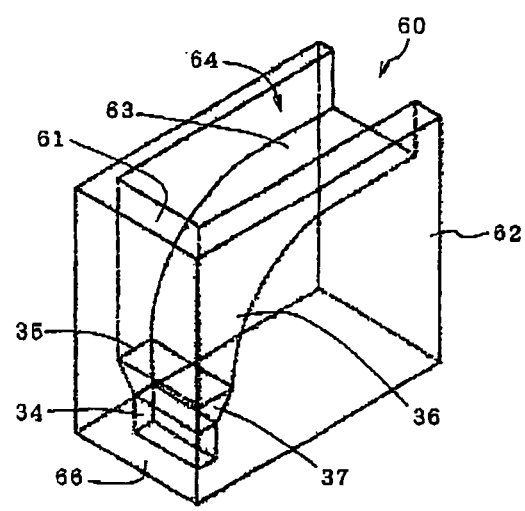
Figure 15C:
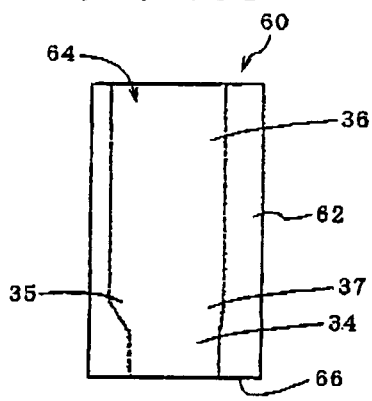
Figure 15D:
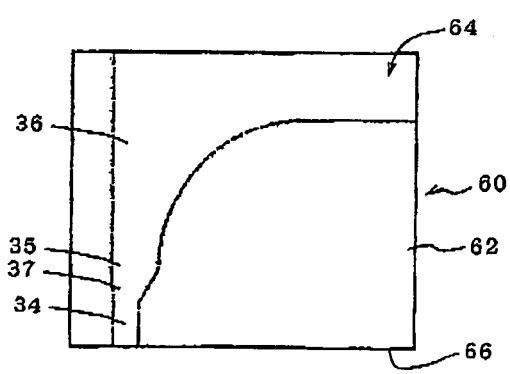
Figure 15E:
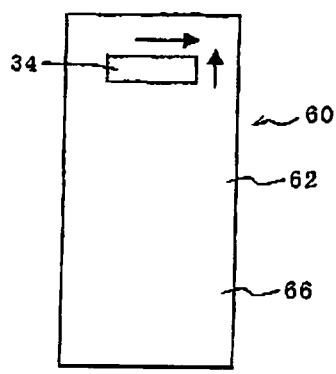

FIGS. 15A to 15E are explanatory diagram showing the optical fiber connecting part 60 in a fourth embodiment according to the present invention, wherein FIG. 15A is a top plan view thereof, FIG. 15B is a perspective view thereof, FIG. 15C is a front view thereof, FIG. 15D is a side view thereof, and FIG. 15E is a bottom view thereof. In FIG. 15E, directions of restricting the tape-like optical fibers 22 are indicated by arrows.

Referring to FIGS. 15A to 15E, the optical fiber connecting part 60 in the fourth embodiment is similar to the optical fiber connecting part 30, except that an optical fiber insertion hole 36 of a ferrule 62 is formed to have a vertical surface 61, which guides an optical fiber (tape-like optical fiber) to be inserted along a vertical direction, and a curved surface 63, which faces to the vertical surface 61 and is curved from the light input/output bore 34 toward a side of one end of the ferrule 62 (upper side in FIGS. 15A to 15E). The ferrule 62 further has a bottom surface 66 similarly to the optical fiber connecting part 30. The same references numerals are assigned to the parts similar to those of the optical fiber connecting part 30.

The vertical plane 61 has a function of guiding the tape-like optical fiber 22 along a thickness direction of the tape-like optical fiber 22 when inserted to a guide bore 64. The curved surface 63 has a function of arranging the tape-like optical fiber 22 in a bent-state (e.g. bent with an angle of substantially 90 degrees) after the tape-like optical fiber 22 is inserted into the guide bore 64.

(Optical Module 65)

Figure 16A:
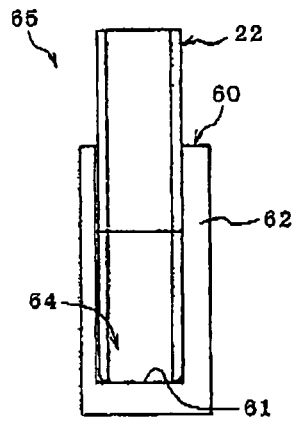
Figure 16B:
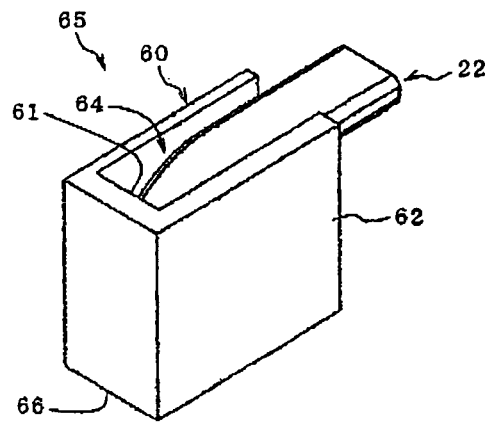
Figure 16C:
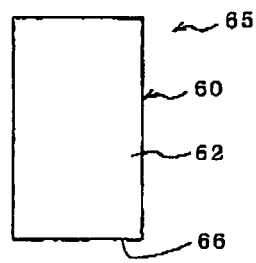
Figure 16D:
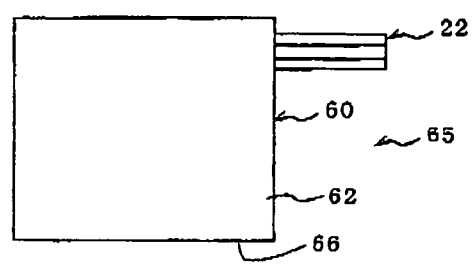
Figure 16E:
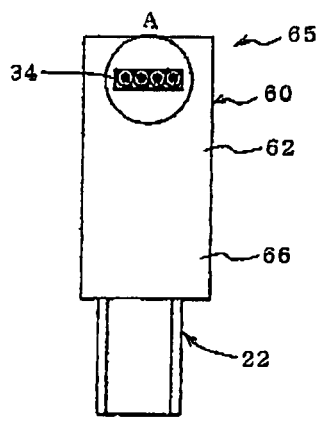
Figure 16F:
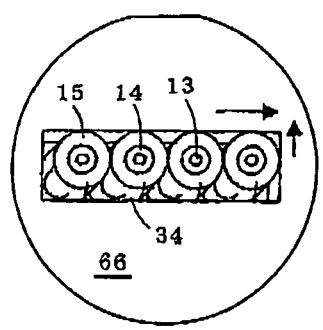
FIG. 16F is an enlarged view of a part A.

FIGS. 16A to 16E are explanatory diagram showing an optical module 65 in which the tape-like optical fiber 22 is connected to the guide bore 64 of the optical fiber connecting part 60 along the curved surface 63 of FIGS. 15A to 15E, wherein FIG. 16A is a top plan view thereof, FIG. 16B is a perspective view thereof, FIG. 16C is a front view thereof, FIG. 16D is a side view thereof, FIG. 16E is a bottom view thereof, and FIG. 16F is an enlarged view of a part A. In FIG. 16F, directions of restricting the tape-like optical fiber 22 are indicated by arrows.

Figure 17A:
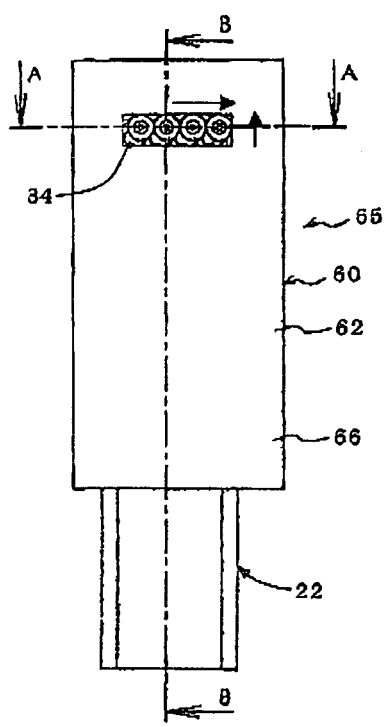
Figure 17B:
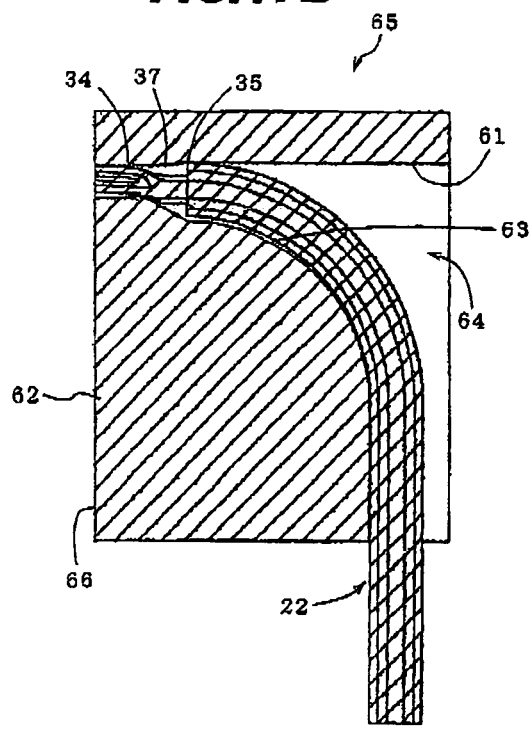
Figure 17C:
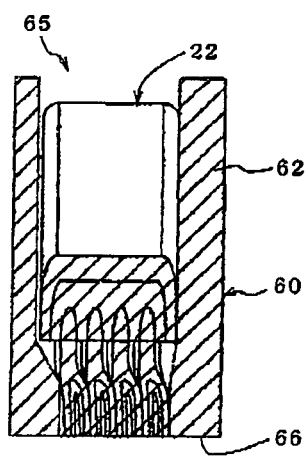

FIGS. 17A to 17C are explanatory diagram showing the optical module 65 in which the tape-like optical fiber 22 is connected to the optical fiber connecting part 60 of FIGS. 15A to 15E, wherein FIG. 17A is a bottom view thereof, FIG. 17B is a cross sectional view along B-B line thereof, and FIG. 17C is a cross sectional view along A-A line thereof. In FIG. 17A, directions of restricting the tape-like optical fiber 22 are indicated by arrows.

Advantages of the Fourth Embodiment

Referring to FIGS. 16A to 16F and 17A to 17C, it is possible to restrict the positions of the respective cores 13 at the bottom surface 66 of the ferrule 62, in the case of taking out the tape-like optical fiber 22 in a direction perpendicular to a light input and output direction of the ferrule 62 (i.e. a direction perpendicular to the bottom surface 66).

(Variation)

Figure 18A:
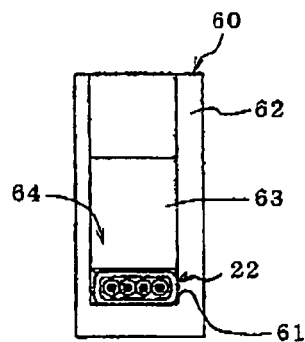
Figure 18B:
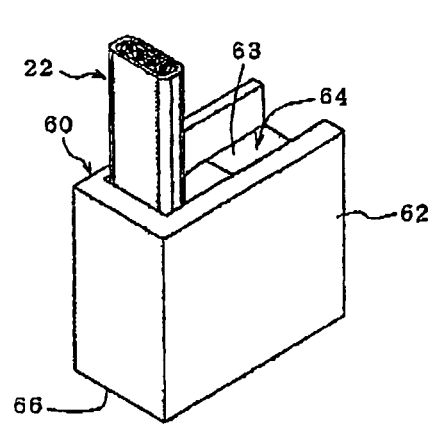
Figure 18C:
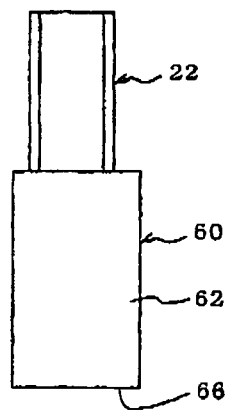
Figure 18D:
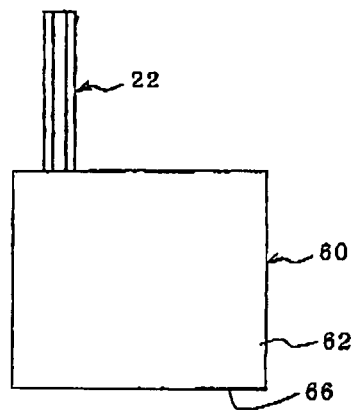
Figure 18E:
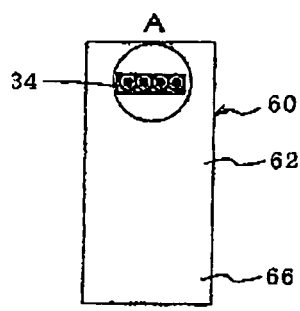
Figure 18F:
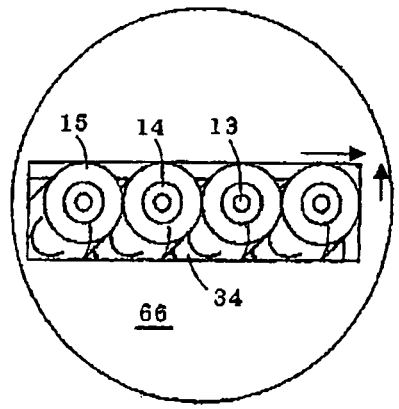
FIG. 18F is an enlarged view of a part A.

FIGS. 18A to 18E are explanatory diagram showing a variation of the optical module 65 in which the tape-like optical fiber 22 is connected to the guide bore 64 of the optical fiber connecting part 60 along the vertical surface 61 of FIGS. 15A to 15E, wherein FIG. 18A is a top plan view thereof, FIG. 18B is a perspective view thereof, FIG. 18C is a front view thereof, FIG. 18D is a side view thereof, FIG. 18E is a bottom view thereof, and FIG. 18F is an enlarged view of a part A. In FIG. 18F, directions of restricting the tape-like optical fiber 22 are indicated by arrows.

According to this variation, it is also possible to restrict the positions of the respective cores 13 at the bottom surface 66 of the ferrule 62, in the case of taking out the tape-like optical fiber 22 in a direction parallel to the light input and output direction of the ferrule 62, similarly to the optical fiber connecting parts 30, 50 as shown in FIGS. 10A to 10E, 11A to 11E, 12A to 12C, 13A to 13C, and 14A to 14E.

Fifth Embodiment

Next, an optical fiber connecting part 70 in the fifth embodiment will be explained below.

Figure 19A:
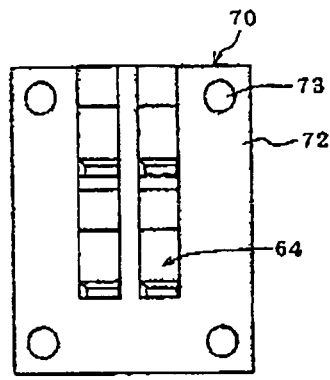
Figure 19B:
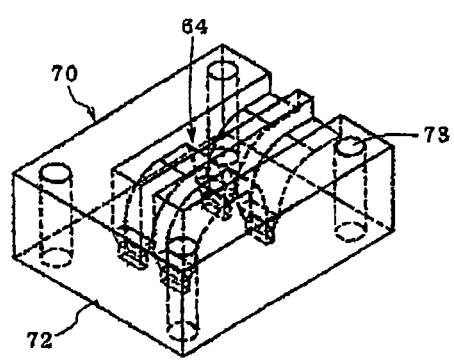
Figure 19C:
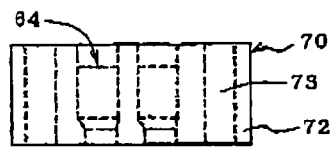
Figure 19D:
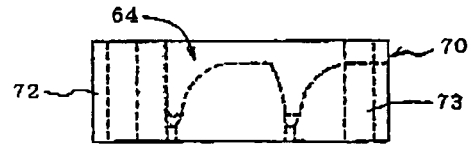
Figure 19E:
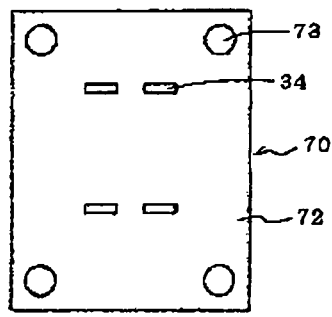

FIGS. 19A to 19E are explanatory diagram showing an optical fiber connecting part 70 in the fifth embodiment according to the present invention, wherein FIG. 19A is a top plan view thereof, FIG. 19B is a perspective view thereof, FIG. 19C is a front view thereof, FIG. 19D is a side view thereof, and FIG. 19E is a bottom view thereof.

Referring to FIGS. 19A to 19E, the optical fiber connecting part 70 in the fifth embodiment comprises a ferrule 72 having a bottom surface 71 which is horizontal with respect to a substrate (not shown), and four guide bores 64 formed within the ferrule 72, by which four sets of tape-like optical fibers 22 are collectively connected to respective arrayed optical devices on the substrate.

Referring to FIGS. 19A to 19E, the ferrule 72 is preferably provided with a hole 73 for mating (connection and position alignment) with a substrate mounting an arrayed optical device or similar optical fiber connecting part (ferrule).

(Variations)

Figure 20A:
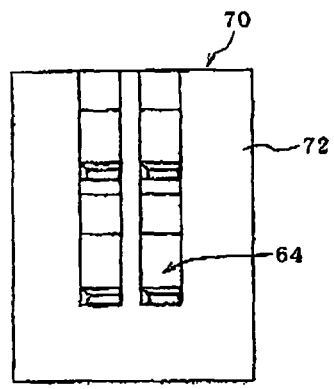
Figure 20B:
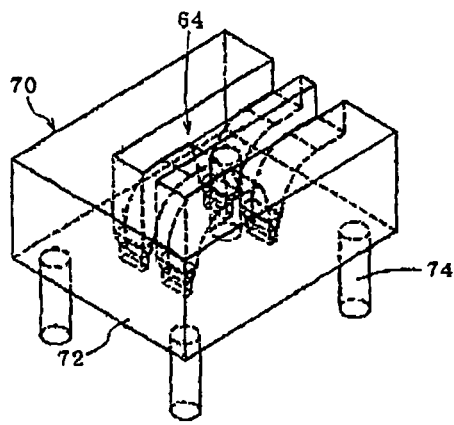
Figure 20C:
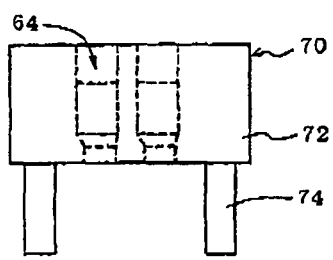
Figure 20D:
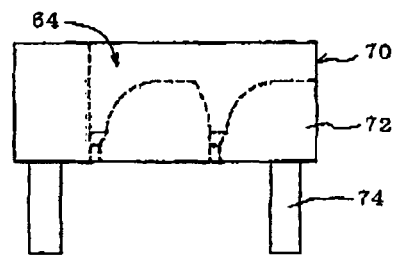
Figure 20E:
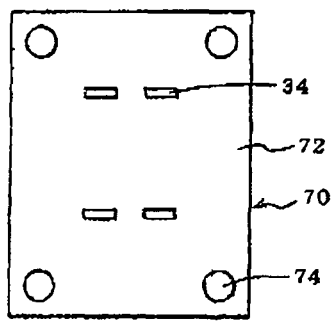

FIGS. 20A to 20E are explanatory diagram showing the optical fiber connecting part 70 in a variation of the fifth embodiment according to the present invention, wherein FIG. 20A is a top plan view thereof, FIG. 20B is a perspective view thereof, FIG. 20C is a front view thereof, FIG. 20D is a side view thereof, and FIG. 20E is a bottom view thereof.

Referring to FIGS. 20A to 20E, it is also preferable that the ferrule 72 may be provided with a pin 74 for mating with the substrate mounting an arrayed optical device or similar optical fiber connecting part (ferrule).

FIGS. 21A to 21E, 22A to 22E and 23A to 23E are explanatory diagram showing examples of optical modules in which the tape-like optical fibers 22 are connected and bonded to the guide bore 64 of the optical fiber connecting part 70.

Figure 21A:
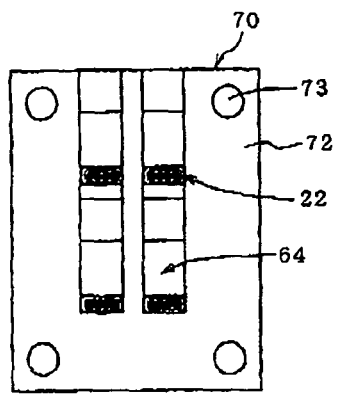
Figure 21B:
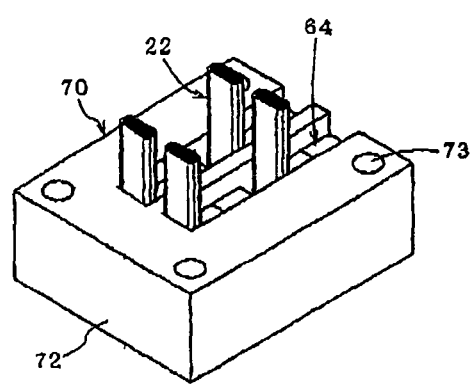
Figure 21C:
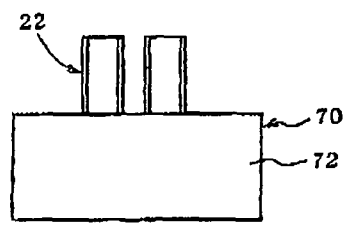
Figure 21D:
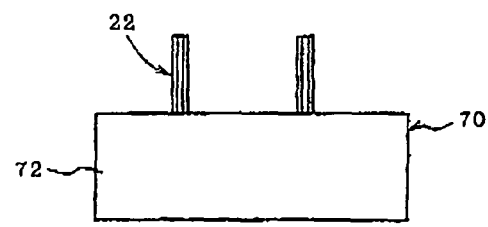
Figure 21E:
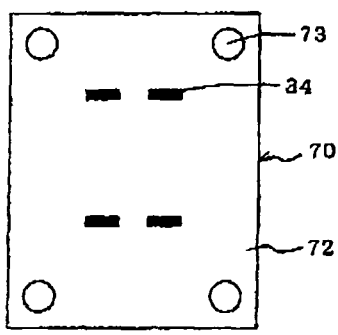

FIGS. 21A to 21E are explanatory diagram showing an example of the optical module in which the tape-like optical fibers 22 are connected and bonded to the optical fiber connecting part 70 of FIGS. 19A to 19E, wherein FIG. 21A is a top plan view thereof, FIG. 21B is a perspective view thereof, FIG. 21C is a front view thereof, FIG. 21D is a side view thereof, and FIG. 21E is a bottom view thereof.

Figure 22A:
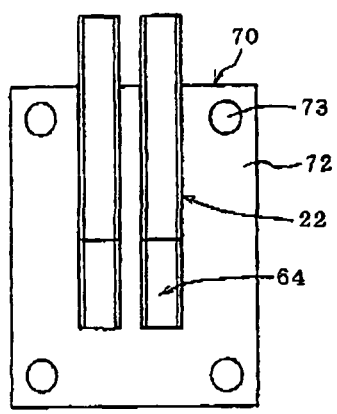
Figure 22B:
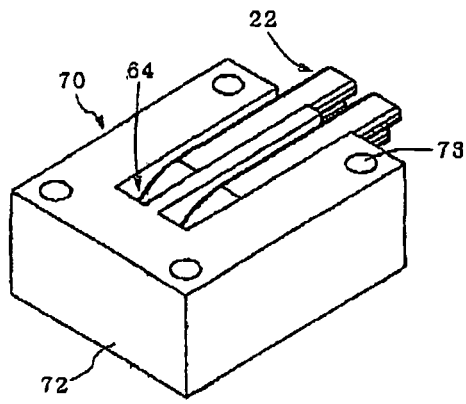
Figure 22C:
Figure 22D:
Figure 22E:
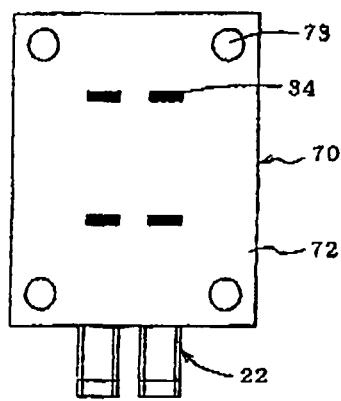

FIGS. 22A to 22E are explanatory diagram showing another example of the optical module in which the tape-like optical fibers 22 are connected and bonded to the optical fiber connecting part 70 of FIGS. 19A to 19E, wherein FIG. 22A is a top plan view thereof, FIG. 22B is a perspective view thereof, FIG. 22C is a front view thereof, FIG. 22D is a side view thereof, and FIG. 22E is a bottom view thereof.

Figure 23A:
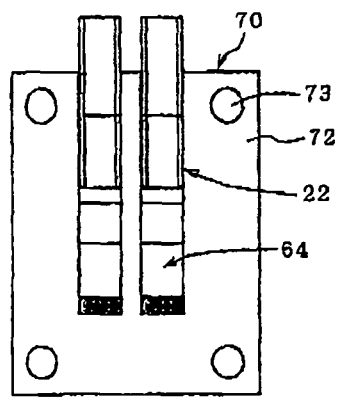
Figure 23B:
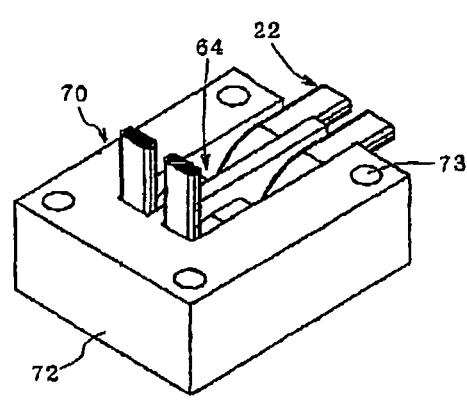
Figure 23C:
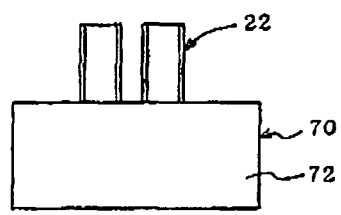
Figure 23D:
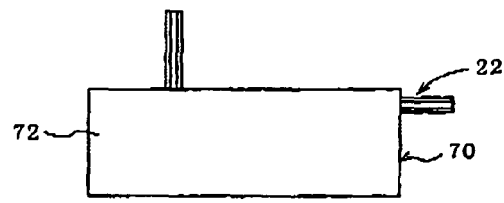
Figure 23E:
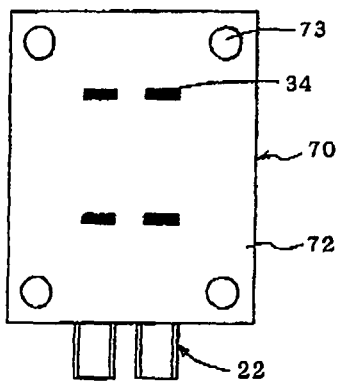

FIGS. 23A to 23E are explanatory diagram showing a still another example of the optical module in which the tape-like optical fibers 22 are connected and bonded to the optical fiber connecting part 70 of FIGS. 19A to 19E, wherein FIG. 23A is a top plan view thereof, FIG. 23B is a perspective view thereof, FIG. 23C is a front view thereof, FIG. 23D is a side view thereof, and FIG. 23E is a bottom view thereof.

Referring to FIGS. 21A to 21E, all of four sets of the tape-like optical fiber 22 may be taken out in a direction parallel to a light input and output direction of the ferrule 72.

Referring to FIGS. 22A to 22E, all of four sets of the tape-like optical fiber 22 may be taken out in a direction perpendicular to the light input and output direction of the ferrule 72.

Referring to FIGS. 23A to 23E, two sets of the tape-like optical fiber 22 may be taken out in the direction perpendicular to the light input and output direction of the ferrule 72, and other two sets of the tape-like optical fiber 22 may be taken out in the direction parallel to the light input and output direction of the ferrule 72.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. An optical fiber connecting part for a tape-like optical fiber, the optical fiber connecting part comprising:
 a ferrule; and
 a guide bore, which is formed to penetrate through the ferrule from an end face on a side of one end to another end face on a side of another end of the ferrule, and configured to guide the tape-like optical fiber to be inserted from the side of the one end of the ferrule toward the end face on the side of the another end of the ferrule, the guide bore comprising:
  an optical fiber insertion hole provided on the side of the one end, through which the tape-like optical fiber is inserted into the ferrule;
  a light input/output bore provided on the side of the another end of the ferrule and having an inner diameter smaller than an inner diameter of the optical fiber insertion hole, through which a light is input and output at the end face on the side of the another end of the ferrule; and
  a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore,
 wherein the shape of the shape-changing bore is changed such that a center position of the light input/output bore is shifted from a center position of the optical fiber insertion hole along a thickness direction and a width direction of the tape-like optical fiber.

2. The optical fiber connecting part according to claim 1, wherein the shape of the shape-changing bore is changed such that the center position of the light input/output bore is shifted along a perpendicular direction with respect to the center position of the optical fiber insertion hole.

3. The optical fiber connecting part according to claim 1, wherein an inclination angle of an inner surface of the shape-changing bore with respect to an insertion direction of the optical fiber is varied in a circumferential direction.

4. The optical fiber connecting part according to claim 1, wherein the optical fiber insertion hole comprises a perpendicular surface which guides the optical fiber to be inserted along a perpendicular direction, and a curved surface, which faces to the perpendicular surface and is curved from the light input/output bore toward the side of the one end of the ferrule.

5. The optical fiber connecting part according to claim 1, wherein the guide bore has a circular shape or a rectangular shape in its cross section along a direction perpendicular to an insertion direction of the optical fiber.

6. The optical fiber connecting part according to claim 1, wherein the ferrule comprises a lens which is integrally formed at the end face on the side of the another end.

7. The optical fiber connecting part according to claim 1, wherein the ferrule comprises a material which transmits a UV light.

8. The optical fiber connecting part according to claim 1, wherein the ferrule is provided with a hole or a pin for mating with a substrate at the end face on the side of the another end.

9. The optical fiber connecting part according to claim 1, wherein the ferrule comprises two or more of ones of the guide bore.

10. An optical module for a tape-like the optical module comprising:
 the tape-like optical fiber; and
 an optical fiber connecting part, comprising:
  a ferrule; and
  a guide bore, which is formed to penetrate through the ferrule from an end face on a side of one end to another end face on a side of another end of the ferrule, and guides the tape-like optical fiber inserted from the side of the one end of the ferrule toward the end face on the side of the another end of the ferrule, the guide bore comprising:
   an optical fiber insertion hole provided on the side of the one end, through which the tape-like optical fiber is inserted into the ferrule;
   a light input/output bore provided on the side of the another end of the ferrule and having an inner diameter smaller than an inner diameter of the optical fiber insertion hole, through which a light is input and output at the end face on the side of the another end of the ferrule; and a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore, wherein the shape of the shape-changing bore is changed such that a center position of the light input/output bore is shifted from a center position of the optical fiber insertion hole along a thickness direction and a width direction of the tape-like optical fiber.

11. An optical fiber connecting part, for a tape-like optical fiber, the optical fiber connecting part comprising:
a ferrule; and
a guide bore penetrating through the ferrule and configured to guide the tape-like optical fiber to be inserted, the guide bore comprising:
a first bore provided at one end of the ferrule, through which the tape-like optical fiber is inserted into the ferrule;
a second bore provided at another end of the ferrule, the second bore having an inner diameter smaller than an inner diameter of the first bore; and
an intermediate bore provided between the first bore and the second bore to directly connect between the first bore and the second bore,
wherein a center position of the second bore is shifted from a center position of the first bore along a thickness direction and a width direction of the tape-like optical fiber.

12. The optical fiber connecting part according to claim 1, wherein the tape-like optical fiber is inserted to contact both of an inner surface of the light input/output bore and an inner surface of the optical fiber insertion hole such that a position of the tape-like optical fiber is restricted to a corner of the light input/output bore.

13. The optical module according to claim 10, wherein the tape-like optical fiber is inserted to contact both of an inner surface of the light input/output bore and an inner surface of the optical fiber insertion hole such that a position of the tape-like optical fiber is restricted to a corner of the light input/output bore.

14. The optical fiber connecting part according to claim 11, wherein the tape-like optical fiber is inserted to contact both of an inner surface of the first bore and an inner surface of the second bore such that a position of the tape-like optical fiber is restricted to a corner of the light input/output bore.

15. The optical fiber connecting part according to claim 1, wherein the light input/output bore and the optical fiber insertion hole are arranged in parallel with each other.

16. The optical module according to claim 10, wherein the light input/output bore and the optical fiber insertion hole are arranged in parallel with each other.

17. The optical fiber connecting part according to claim 11, wherein the first bore and the second bore are arranged in parallel with each other.

18. The optical fiber connecting part according to claim 1, wherein the optical fiber is inserted to contact at least one of an inner surface of the light input/output bore and an inner surface of the optical fiber insertion hole.

19. The optical module according to claim 10, wherein the optical fiber is inserted to contact at least one of an inner surface of the light input/output bore and an inner surface of the optical fiber insertion hole.

20. The optical fiber connecting part according to claim 11, wherein the optical fiber is inserted to contact at least one of an inner surface of the first bore and an inner surface of the second bore.

* * * * *